United States Patent
Wang et al.

(10) Patent No.: US 11,283,503 B2
(45) Date of Patent: Mar. 22, 2022

(54) COMMUNICATION METHOD AND COMMUNICATIONS APPARATUS

(71) Applicant: Huawei Technologies Co., Ltd., Shenzhen (CN)

(72) Inventors: Ting Wang, Shanghai (CN); Liuliu Ji, Shanghai (CN); Shengyue Dou, Shanghai (CN); Jinyao Liang, Shenzhen (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 197 days.

(21) Appl. No.: 16/716,158

(22) Filed: Dec. 16, 2019

(65) Prior Publication Data
US 2020/0119797 A1  Apr. 16, 2020

Related U.S. Application Data
(63) Continuation of application No. PCT/CN2018/091677, filed on Jun. 15, 2018.

(30) Foreign Application Priority Data
Jun. 16, 2017  (CN) .......................... 201710459793.7

(51) Int. Cl.
*H04B 7/06* (2006.01)
*H04W 72/04* (2009.01)
(Continued)

(52) U.S. Cl.
CPC ......... *H04B 7/0626* (2013.01); *H04B 7/0632* (2013.01); *H04W 72/0453* (2013.01);
(Continued)

(58) Field of Classification Search
None
See application file for complete search history.

(56) References Cited

U.S. PATENT DOCUMENTS

| | | | |
|---|---|---|---|
| 2009/0154588 A1* | 6/2009 | Chen | H04L 5/0023 375/267 |
| 2013/0244676 A1* | 9/2013 | Koivisto | H04L 25/0224 455/452.1 |
| 2015/0171948 A1* | 6/2015 | Xiao | H04L 5/0048 370/252 |

FOREIGN PATENT DOCUMENTS

| | | |
|---|---|---|
| CN | 102237968 A | 11/2011 |
| EP | 3104541 A1 | 12/2016 |
| WO | 2016163797 A1 | 10/2016 |

OTHER PUBLICATIONS

"Channel and interference measurement for CSI acquisition," 3GPP TSG RAN WG1 Meeting #89, R1-1706927, Hangzhou, China, total 12 pages, 3rd Generation Partnership Project, Valbonne, France (May 15-19, 2017).

(Continued)

*Primary Examiner* — Ayanah S George
(74) *Attorney, Agent, or Firm* — Leydig, Voit & Mayer, Ltd.

(57) ABSTRACT

This application provides a communication method, a terminal device, and a network device. The method includes the steps of: receiving, by the terminal device, configuration information, where the configuration information is used to instruct the terminal device to jointly report channel state information (CSI) for at least two groups of channel state information-reference signal (CSI-RS) resources; receiving, by the terminal device, CSI-RSs carried on the at least two groups of CSI-RS resources; and jointly reporting, by the terminal device, CSI based on a result of measuring the CSI-RSs carried on the at least two groups of CSI-RS (Continued)

resources. According to embodiments of this application, transmission performance can be improved.

14 Claims, 5 Drawing Sheets

(51) Int. Cl.
*H04W 72/12* (2009.01)
*H04W 88/06* (2009.01)
(52) U.S. Cl.
CPC ... *H04W 72/1268* (2013.01); *H04W 72/1289* (2013.01); *H04W 88/06* (2013.01)

(56) References Cited

OTHER PUBLICATIONS

"Discussion on CSI Framework and Aperiodic CSI-RS Resources and Reports Activation," 3GPP TSG RAN WG1 Meeting #89, R1-1707086, Hangzhou, China, total 5 pages, 3rd Generation Partnership Project, Valbonne, France (May 15-19, 2017).
"CSI measurement and reporting for coordinated transmission scheme," 3GPP TSG RAN WG1 Meeting #88, R1-1701679, XP051208845, Athens, Greece, total 7 pages, 3rd Generation Partnership Project, Valbonne, France (Feb. 13-17, 2017).
"CSI reporting configurations," 3GPP TSG-HAN WG1 #88, R1-1702681, XP051209828, Athens, Greece, total 4 pages, 3rd Generation Partnership Project, Valbonne, France (Feb. 13-17, 2017).

* cited by examiner

COMMUNICATION METHOD AND COMMUNICATIONS APPARATUS

CROSS-REFERENCE TO RELATED APPLICATIONS

This application is a continuation of International Application No. PCT/CN2018/091677, filed on Jun. 15, 2018, which claims priority to Chinese Patent Application No. 201710459793.7, filed on Jun. 16, 2017. The disclosures of the aforementioned applications are hereby incorporated by reference in their entireties.

TECHNICAL FIELD

This application relates to the communications field, and more specifically, to a channel state information transmission method and device.

BACKGROUND

A next-generation mobile communications system requires large-capacity and high-quality data transmission. A multiple input multiple output (MIMO) technology is considered one of the key technologies that can implement future high-rate data transmission. A plurality of transmit antennas in a distributed MIMO system are distributed at different geographical positions, and pairs of transmit and receive links in the distributed MIMO system are independent of each other. Therefore, the distributed MIMO system has advantages such as a large capacity, low power consumption, better coverage, and low electromagnetic damage to human bodies, and is considered as one of alternative solutions for a future wireless communications system. In a case of distributed MIMO, to improve signal reliability of an edge user and a throughput of an edge cell, it may be considered to use a multipoint transmission technology, for example, a coordinated multipoint transmission/reception (CoMP) technology, a multipoint space frequency block coding (SFBC) technology, or a multipoint multiflow transmission technology.

In the multipoint transmission technology, each transmission point in joint transmission needs to know accurate channel state information (CSI). The accurate CSI can enable the transmission point to properly process to-be-sent data, for example, precode the to-be-sent data, or determine a modulation and coding scheme for the to-be-sent data, to improve data transmission efficiency and improve system performance.

CSI usually includes a precoding matrix indicator (PMI), a channel quality indicator (CQI), and a rank indicator (RI). The PMI is used to indicate a precoding matrix, and a transmission point may select, based on the PMI, a precoding matrix used to precode data. The CQI is used to indicate channel quality, and is used to provide a reference for the transmission point to determine a modulation and coding scheme. The RI is used to indicate a quantity of layers at which data can be simultaneously transmitted by the transmission point to a terminal, and a larger RI indicates more layers at which data is simultaneously transmitted.

In the multipoint transmission technology, in CSI measurement in the prior art, a terminal device separately measures CSI for all transmission points and feeds back CSI. In this case, if in the multipoint transmission technology, a plurality of transmission points transmit one code word at different layers, and the code word corresponds to only one modulation and coding scheme (MCS), in an existing CSI feedback manner, a transmission point obtains a plurality of CQIs having different values, and consequently the transmission point cannot determine a CQI used to determine an MCS, affecting transmission performance.

SUMMARY

This application provides a communication method and a communications apparatus to improve transmission performance.

According to a first aspect, a communication method is provided, and the method includes: sending, by a network device, configuration information to a terminal device, where the configuration information is used to instruct the terminal device to jointly report channel state information CSI for at least two groups of channel state information-reference signal CSI-RS resources; correspondingly, receiving, by the terminal device, the configuration information; sending, by the network device, CSI-RSs on the at least two groups of CSI-RS resources; correspondingly, receiving, by the terminal device, the CSI-RSs carried on the at least two groups of CSI-RS resources; jointly reporting, by the terminal device, CSI based on a result of measuring the CSI-RSs carried on the at least two groups of CSI-RS resources; and correspondingly, receiving, by the network device, the CSI that is jointly reported by the terminal device based on the result of measuring the CSI-RSs carried on the at least two groups of CSI-RS resources.

Therefore, in this embodiment of this application, the configuration information is used to instruct the terminal device to perform joint reporting, for example, report one CQI, for two groups of CSI-RS resources. This avoids a prior-art problem caused by separately measuring CSI for all transmission points and feeding back CSI by a terminal device. In addition, in this embodiment of this application, only one CQI may be reported for a plurality of groups of CSI-RS resources, and therefore control signaling overheads can be reduced, and coordinated transmission of a plurality of transmission points is implemented through scheduling for one code word.

It should be understood that in this embodiment of this application, joint CSI reporting may be that the terminal device performs joint measurement for the at least two groups of CSI-RS resources, and reports one piece of CSI or a plurality of pieces of CSI, where when the plurality of pieces of CSI are reported, there is a same CQI in the plurality of pieces of CSI. Specifically, because the terminal device may obtain only one CQI during joint measurement, the terminal device may report the CSI, where the CSI includes the CQI, or may report CSI for each group of CSR-RSs, where each piece of CSI includes the CQI.

Optionally, joint CSI reporting may be that the terminal device performs separate measurement for the at least two groups of CSI-RS resources, and reports one piece of CSI (the CSI includes one CQI) or a plurality of pieces of CSI, where when the plurality of pieces of CSI are reported, there is a same CQI in the plurality of pieces of CSI. Specifically, because when performing separate measurement for the at least two groups of CSI-RS resources, the terminal device can obtain one CQI for each group of CSI-RS resources, in other words, the terminal device can obtain a plurality of CQIs, one CQI in joint reporting may be a CQI determined by the terminal device based on the plurality of CQIs, for example, a largest value in, a smallest value in, or an average value of the plurality of CQIs.

Optionally, joint CSI reporting may be that the terminal device performs separate measurement for the at least two groups of CSI-RS resources, and reports a plurality of CQIs, where one of the plurality of CQIs reported by the terminal device is a reference CQI in a plurality of CQIs that can be obtained by the terminal device and the other CQI is a difference between the other CQI and the reference CQI. In this case, the reported plurality of CQIs may be reported by the terminal device via one or more pieces of CSI. This embodiment of this application is not limited thereto.

It should be understood that in this embodiment of this application, one group of CSI-RS resources (which may also be referred to as one CSI-RS resource) may be a resource used by the terminal device for channel measurement. For example, one group of CSI-RS resources is a resource carrying an NZP CSI-RS. Optionally, one group of CSI-RS resources may be one resource set described above, or may be some resources in one resource set. Optionally, one group of CSI-RS resources may correspond to one CSI-RS resource identifier, for example, an NZP CSI-RS resource ID1, and another group of CSI-RS resources corresponds to another CSI-RS resource identifier, for example, an NZP CSI-RS resource ID2. Optionally, one group of CSI-RS resources may alternatively correspond to one group of antenna ports in one CSI-RS resource identifier, and another group of CSI-RS resources corresponds to another group of antenna ports in the CSI-RS resource identifier. Optionally, when the at least two groups of CSI-RS resources correspond to at least two groups of antenna ports in one CSI-RS resource identifier, QCL indication information is configured for each group of antenna ports.

It should be understood that in this embodiment of this application, when the terminal performs channel measurement based on the at least two groups of CSI-RS resources, a CQI in the jointly reported CSI may be determined by the terminal device after the terminal device performs comprehensive measurement based on the at least two groups of CSI-RS resources and another resource configured for interference measurement.

Specifically, the configuration information may be sent by the network device via higher layer signaling. For example, the network device sends the configuration information via radio resource control (RRC) signaling or medium access control (MAC) signaling. The network device may alternatively send the configuration information via other signaling. This embodiment of the present disclosure is not limited thereto.

Optionally, in an implementation of the first aspect, the configuration information includes one of the following: a correspondence between the at least two groups of CSI-RS resources and a same CSI reporting set; an association relationship between the at least two groups of CSI-RS resources, where the association relationship between the at least two groups of CSI-RS resources includes an association relationship between identifiers of the at least two groups of CSI-RS resources or an association relationship between antenna ports of the at least two resources; an association relationship between CSI reporting sets corresponding to the at least two groups of resources; an association relationship between association information corresponding to the at least two groups of CSI-RS resources; resource triggering information, where the resource triggering information is used to trigger a reporting set or a resource set of the at least two groups of CSI-RS resources; indication information used to indicate that channel state information needs to be jointly reported for at least one of a reporting set, a resource set, or association information of a CSI-RS resource; or the configuration information includes a resource set of one group of the at least two groups of CSI-RS resources, where the resource set includes identification information or antenna port information of the other group of the at least two groups of CSI-RS resources.

Therefore, in this embodiment of this application, the configuration information is used to instruct the terminal device to perform joint reporting, for example, report one CQI, for two groups of CSI-RS resources. This avoids a prior-art problem caused by separately measuring CSI for all transmission points and feeding back CSI by a terminal device. In addition, in this embodiment of this application, only one CQI may be reported for a plurality of groups of CSI-RS resources, and therefore control signaling overheads can be reduced, and coordinated transmission of a plurality of transmission points is implemented through scheduling for one code word.

It should be understood that the CSI jointly reported by the terminal device may specifically include one CQI, a plurality of CQIs, or a plurality of CQI differences.

It should be understood that after the network device obtains the CSI jointly reported by the terminal device, the network device may modulate and code a same code word based on the CSI, and send the modulated and coded code word to the terminal device via at least two data streams, where one data stream may correspond to one group of QCL antenna ports. Correspondingly, the terminal device receives the plurality of data streams for the same code word, where antenna ports of one data stream meet a QCL relationship, and antenna ports of different data streams do not meet the QCL relationship.

It should be noted that when the CSI jointly reported by the terminal device includes one CQI, the network device may directly perform modulation and coding by using the CQI and send a plurality of streams of a same code word. Optionally, when the CSI reported by the terminal device includes a plurality of CQIs or includes at least one CQI and a CQI difference, the network device may determine, based on the CSI reported by the terminal device, one CQI for modulation and coding, and send a plurality of streams of a same code word. Specifically, the network device may determine one CQI in a plurality of manners. This is not limited in this embodiment of this application.

The following describes, in detail with reference to specific examples, specific forms in which the terminal device jointly reports a CQI in this embodiment of this application.

Optionally, in an implementation of the first aspect, the jointly reported CSI includes one CQI.

For example, a CQI is fed back on a full bandwidth. Assuming that the at least two groups of CSI-RS resources are M groups of CSI-RS resources, the terminal device may perform separate measurement for the M groups of resources, to obtain M CQIs in one-to-one correspondence to the M groups of resources, and the terminal device may report one CQI based on the M CQIs, where the CQI may be a largest value in, a smallest value in, or an average value of the M CQIs, or the like.

For another example, a CQI is fed back on a full bandwidth. Assuming that the at least two groups of CSI-RS resources are M groups of CSI-RS resources, the terminal device may perform joint measurement for the M groups of resources, to obtain one CQI corresponding to the M groups of resources, and report the CQI.

Therefore, in this embodiment of this application, joint reporting is performed, to be specific, one CQI is reported, for two groups of CSI-RS resources. This avoids a prior-art problem caused by separately measuring CSI for all transmission points and feeding back CSI by a terminal device. In this embodiment of this application, only one CQI may be reported for a plurality of groups of CSI-RS resources, and therefore control signaling overheads can be reduced, and coordinated transmission of a plurality of transmission points is implemented through scheduling for one code word.

Optionally, in an implementation of the first aspect, each group of the at least two groups of CSI-RS resources includes N subbands, where N is an integer greater than 1; and the jointly reported CSI includes CSI corresponding to a subband having best performance in subbands meeting a target requirement in all subbands corresponding to the plurality of resources, where the subbands meeting the target requirement are subbands whose block error rates are less than a preset block error rate threshold, and the subband having the best performance in the subbands meeting the target requirement is a subband having a highest throughput, a largest MCS, or a largest CQI value in the subbands meeting the target requirement.

Therefore, in this embodiment of this application, joint reporting is performed, to be specific, a CQI corresponding to one subband is reported, for two groups of CSI-RS resources. This avoids a prior-art problem caused by separately measuring CSI for all transmission points and feeding back CSI.

Optionally, in an implementation of the first aspect, each group of the at least two groups of CSI-RS resources includes N subbands; and the jointly reported CSI includes CSI corresponding to a subband, in the N subbands, in which a difference between CQIs corresponding to different CSI-RS resources meets a requirement, where the requirement is that a CQI difference is the smallest, or that a CQI difference is less than or equal to a CQI difference threshold and a reference CQI has a largest value, the reference CQI is a CQI used as a reference for comparison with CQIs in different subbands, and the reference CQI is a function of CQIs corresponding to different CSI-RS resources in a same subband.

Optionally, in an implementation of the first aspect, the function is one of the following: the reference CQI is a largest value in CQIs corresponding to different CSI-RS resources; the reference CQI is a smallest value in CQIs corresponding to different CSI-RS resources; or the reference CQI is an average value of CQIs corresponding to different CSI-RS resources.

Optionally, in an implementation of the first aspect, the at least two groups of CSI-RS resources are M groups of CSI-RS resources; and the CSI corresponding to the subband includes T PMIs corresponding to the subband and P CQIs corresponding to the subband, or the CSI includes T PMIs corresponding to the subband, a CQI corresponding to one group of CSI-RS resources in the subband, and a CQI difference corresponding to the other group of CSI-RS resources, where the CQI difference is a difference between a CQI corresponding to the other group of CSI-RS resources and the CQI, where T is an integer not greater than M, P is an integer not less than 1 and not greater than M, and M is an integer not less than 2.

Therefore, based on a configuration of the network device, the terminal device may perform measurement for the at least two groups of CSI-RS resources, and jointly report the CSI. Because when the CSI is reported, only a baseline CQI value and a difference corresponding to the other group of resources are reported, resource overheads can be reduced, and network performance can be improved.

Optionally, in an implementation of the first aspect, a quantity of CQIs in the jointly reported CSI is determined based on a quantity of reporting sets or resource sets of the M groups of CSI-RS resources, or a quantity of CQIs in the CSI is determined based on a quantity of reported CQIs that is configured in a reporting set of the M groups of CSI-RS resources; and a quantity of PMIs in the jointly reported CSI is determined based on a quantity of pieces of channel measurement association information corresponding to the M groups of CSI-RS resources, or a quantity of PMIs in the CSI is determined based on a quantity of pieces of QCL indication information corresponding to the M groups of resources.

Optionally, in an implementation of the first aspect, the jointly reported CSI includes a CQI of a reference resource and a CQI difference or difference indication information corresponding to the other group of resources, the reference resource is one group of the at least two groups of CSI-RS resources, the CQI difference is a difference between a CQI of the other group of CSI-RS resources and the CQI of the reference resource, and the difference indication information is used to indicate the difference between the CQI of the other group of CSI-RS resources and the CQI of the reference resource.

Optionally, in an implementation of the first aspect, the configuration information includes indication information of the reference resource, the reference resource is determined by the terminal device based on the indication information of the reference resource, the indication information of the reference resource is used to indicate at least one of the following information corresponding to one group of the at least two groups of CSI-RS resources: resource identification information, association information identification information, and reporting set identification information; or the reference resource is determined by the terminal device in the at least two groups of CSI-RS resources according to a predefined rule.

Optionally, in an implementation of the first aspect, the configuration information includes a reporting set of CSI-RS resources in the at least two groups of CSI-RS resources, the reporting set includes same-CQI feedback indication information, and the same-CQI feedback indication information is used to indicate that CQIs included in CSI that the terminal device needs to feed back for the CSI-RS resources have a same value, where the jointly reported CSI includes a plurality of pieces of CSI that is in one-to-one correspondence to the at least two groups of CSI-RS resources, and CQIs included in the plurality of pieces of CSI have a same value.

Therefore, in this embodiment of this application, a plurality of CQIs having a same value are reported for a plurality of CSI-RS resources. This can resolve a prior-art problem caused by different values of a plurality of CQIs, so that the network device can accurately determine a modulation and coding scheme. In addition, a CQI is reported for each group of CSI-RSs, so that a quantity of bits for CSI feedback for one CSI reporting setting can be kept the same as that in the prior art, and this embodiment of this application can be compatible with the prior art, thereby reducing impact on an existing protocol.

Corresponding to the communication method in the first aspect, this application further provides a communications apparatus. The communications apparatus may be any transmit end device or receive end device that wirelessly transmits data, for example, a communications chip, a terminal device, or a network device (for example, a base station). In a communication process, a transmit end device is relative to a receive end device. In some communication processes, the communications apparatus may be used as the first device, and in some communication process, the communications apparatus may be used as the second device. For example, for downlink data transmission, a transmit end device is a base station, and a corresponding receive end device is a terminal device; for uplink data transmission, a transmit end device is a terminal device, and a corresponding receive end device is a base station; and for D2D (device to device) data communication, a transmit end device is UE, and a corresponding receive end device may also be UE. A communication manner is not limited in this application.

According to a second aspect, a communications apparatus is provided, and includes a sending unit and a receiving unit, to perform the method in any possible implementation of the first aspect. The sending unit is configured to execute a sending-related function, and the receiving unit is configured to execute a receiving-related function.

In a design, the communications apparatus is a communications chip, the sending unit may be an input circuit or interface of the communications chip, and the sending unit may be an output circuit or interface of the communications chip.

In another design, the communications apparatus is a terminal device, and the sending unit may be a transmitter machine or a transmitter.

In another design, the communications apparatus is a network device, and the sending unit may be a receiver machine or a receiver.

Optionally, the communications apparatus further includes modules configured to perform the communication method in the possible implementations of the first aspect.

According to a third aspect, a communications apparatus is provided, and includes a processor and a memory. The memory is configured to store a computer program, and the processor is configured to invoke the computer program from the memory and run the computer program, so that the communications apparatus performs the method in any possible implementation of the first aspect.

Optionally, there are one or more processors, and there are one or more memories.

Optionally, the memory may be integrated into the processor, or the memory and the processor are separately disposed.

Optionally, the communications apparatus further includes a transmitter and a receiver.

In a possible design, a terminal device is provided, and includes a transceiver, a processor, and a memory. The processor is configured to control the transceiver to send and receive signals, the memory is configured to store a computer program, and the processor is configured to invoke the computer program from the memory and run the computer program, so that the terminal device performs the method in the first aspect or any possible implementation of the first aspect.

In another possible design, a network device is provided, and includes a transceiver, a processor, and a memory. The processor is configured to control the transceiver to send and receive signals, the memory is configured to store a computer program, and the processor is configured to invoke the computer program from the memory and run the computer program, so that the network device performs the method in the second aspect or any possible implementation of the second aspect.

According to a fourth aspect, a system is provided. The system includes the foregoing terminal device and network device.

According to a fifth aspect, a computer program product is provided. The computer program product includes a computer program (which may also be referred to as code or an instruction), and when the computer program is run, a computer is enabled to perform the method in the first aspect or any possible implementation of the second aspect.

According to a sixth aspect, a computer-readable medium is provided. The computer-readable medium stores a computer program (which may also be referred to as code or an instruction), and when the computer program is run on a computer, the computer is enabled to perform the method in the first aspect or any possible implementation of the second aspect.

DESCRIPTION OF EMBODIMENTS

The following describes technical solutions of this application with reference to the accompanying drawings.

The embodiments of this application may be applied to various communications systems. Therefore, the following descriptions are not limited to a particular communications system. For example, the embodiments of this application may be applied to a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunications system (UMTS), a wireless local area network (WLAN), wireless fidelity (WiFi), and a next-generation communications system, namely, a 5th generation (5G) communications system, for example, a new radio (NR) system.

In the embodiments of this application, a network device may be a base transceiver station (BTS) in a global system for mobile communications (GSM) or code division multiple access (CDMA), or may be a NodeB (NB) in wideband code division multiple access (WCDMA), or may be an evolved NodeB (eNB/eNodeB) in LTE, a relay node, an access point, or a network side device in a future 5G network, for example, a transmission point (a TRP or TP) in an NR system, a gNB in the NR system, a radio frequency unit such as a remote frequency unit in the NR system, or one antenna panel or one group of antenna panels (including a plurality of antenna panels) of a base station in the 5G system. Different network devices may be located in a same cell, or may be located in different cells. This is not specifically limited herein. In the embodiments of this application, a terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, an in-vehicle device, a wearable device, a drone device, or a terminal device in a future 5G network.

Figure 1:
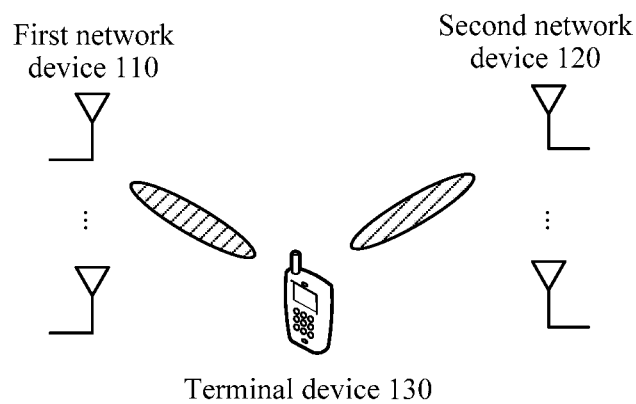
FIG. 1 is a schematic scenario diagram of a system to which the embodiments of this application may be applied.

FIG. 1 is a schematic block diagram of a wireless communications system 100 to which the embodiments of this application are applicable. The wireless communications system 1000 may include a first network device 1010, a second network device 1020, and one or more terminal devices 1030 in a coverage range of the first network device 1010 and the second network device 1020. The terminal device 1030 may be mobile or fixed. Both the first network device 1010 and the second network device 1020 may communicate with the terminal device 1030 through wireless air interfaces. The first network device 1010 and the second network device 1020 may provide communication coverage for a particular geographical area, and may communicate with a terminal device in the coverage area.

It should be understood that "first", "second", and the like in this embodiment of this application are merely used for distinguishing, and "first" and "second" do not constitute any limitation to this embodiment of this application.

The wireless communications system 1000 may support a scenario of a multipoint transmission technology, for example, a coordinated multipoint transmission/reception (CoMP) technology, a multipoint space frequency block coding (SFBC) technology, or a multipoint multiflow transmission technology.

For example, when the wireless communications system 1000 is used in a CoMP transmission scenario, at least two network devices (which may also be referred to as transmission points) may transmit downlink data to a terminal device in a coordinated multipoint transmission manner. In other words, the terminal device 1030 may communicate with both the first network device 1010 and the second network device 1020 on a same carrier. The coordinated multipoint transmission manner may be implemented by using technologies such as space diversity and/or spatial multiplexing. This is not limited in this application.

The "coordinated multipoint transmission" in this application includes but is not limited to joint transmission (JT). The JT includes coherent JT and non-coherent JT (NCJT), and a difference between the coherent JT and the non-coherent JT is that for the NCJT, separate beamforming is performed for different MIMO data streams from a plurality of coordinated TPs, and for the coherent JT, joint beamforming is performed for all MIMO data streams from a plurality of coordinated TPs.

For another example, when the wireless communications system 100 is used in a multipoint space frequency block coding transmission scenario, the first network device 1010 and the first network device 1020 may perform joint transmission by using an SFBC-based transmit diversity. Each network device may perform layer mapping on a modulation symbol of a same code word to obtain one transport layer data stream, and precode the transport layer data stream. Then, the two network devices perform joint SFBC processing on two transport layer data streams corresponding to the code word, and then map processed transport layer data streams to antenna ports for sending. Optionally, the network devices use a same code word. Alternatively, the first network device 1010 and the first network device 1020 perform joint transmission by using an SFBC+frequency switched transmit diversity (FSTD)-based transmit diversity. Each network device performs layer mapping on a modulation symbol of a same code word to obtain two transport layer data streams, and precodes the two transport layer data streams. Then, the two network devices perform joint SFBC+FSTD processing on four transport layer data streams corresponding to the code word, and then map processed transport layer data streams to antenna ports for sending. Optionally, the network devices use a same code word.

For another example, when the wireless communications system 1000 is used in a multipoint multiflow transmission scenario, each of at least two transmission points, for example, the first network device 1010 and the second network device 1020, performs layer mapping on a modulation symbol of a same code word to obtain two transport layer data streams, precodes the two transport layer data streams, and maps processed transport layer data streams to antenna ports for sending.

In the multipoint transmission technology, each transmission point in joint transmission or a transmission point that makes a scheduling decision needs to know accurate channel state information (CSI). The accurate CSI can enable the transmission point to properly process to-be-sent data, for example, precode the to-be-sent data, or determine a modulation and coding scheme for the to-be-sent data, to improve data transmission efficiency and improve system performance.

In the current multipoint transmission technology, in CSI measurement, a terminal device separately measures CSI for all transmission points and feeds back CSI. In this case, if in the multipoint transmission technology, a plurality of transmission points transmit one code word at different layers, because the code word corresponds to only one modulation and coding scheme (MCS), in the foregoing CSI feedback manner, a transmission point obtains a plurality of CQIs having different values, so that the transmission point cannot determine a CQI used to determine an MCS, affecting transmission performance.

A channel state information-reference signal (CSI-RS) is a reference signal used for channel measurement. In a specific system, another reference signal such as a demodulation reference signal may be used for channel measurement. This is not specifically limited herein. The present disclosure provides descriptions by using the CSI-RS as an example.

In view of this, in a channel state measurement solution in the embodiments of the present disclosure, joint reporting is performed for a plurality of groups of CSI-RS resources. This avoids a prior-art problem caused by separate CSI reporting.

For ease of understanding and description, by way of example rather than limitation, the following describes an execution process and execution actions of a control information transmission method in a communications system in this application.

It should be noted that some names and English abbreviations in an LTE system are used in this specification as examples to describe the embodiments of this application, but the embodiments of this application are not limited thereto. The names and the English abbreviations may change as a network evolves. For specific evolution, refer to descriptions in a corresponding standard, for example, refer to corresponding descriptions in 5G.

First, for ease of understanding the channel state information transmission method in this specification, a CSI feedback solution of a terminal device in a multipoint transmission technology in the embodiments of this application is described.

In a transmission scenario of the multipoint transmission technology, for CSI measurement, a network device may configure three sets for the terminal device via, for example, higher layer signaling: a CSI reporting set (which may also be referred to as a CSI reporting set configuration or a reporting set or CSI reporting setting), a resource set (which may also be referred to as a resource set configuration or resource setting), and a CSI measurement set (which may also be referred to as a measurement set configuration or measurement setting). The CSI measurement set includes at least one piece of association information (link), and each piece of association information corresponds to one CSI reporting set and one resource set.

The CSI reporting set is used to indicate reported parameter information (e.g., an RI, a PMI, a CQI, or a CSI-RS resource indicator (CRI)), CSI types (e.g., a type I and a type II), codebook configuration information (e.g., codebook restriction information), time domain behavior, a frequency domain granularity (e.g., a PMI or CQI reporting granularity, a full bandwidth, a subband, or some subbands), a measurement restriction configuration, or the like.

Each resource set includes at least one CSI-RS resource set or at least one CSI-RS resource, and each CSI resource set includes at least one CSI-RS resource. Configuration information of a CSI-RS resource includes a mapped resource element (RE), a quantity of antenna ports, time domain behavior, and the like.

Each piece of association information in the CSI measurement set includes a CSI reporting set identifier, a resource set identifier, and a measurement quantity (e.g., a channel or interference).

Figure 2:
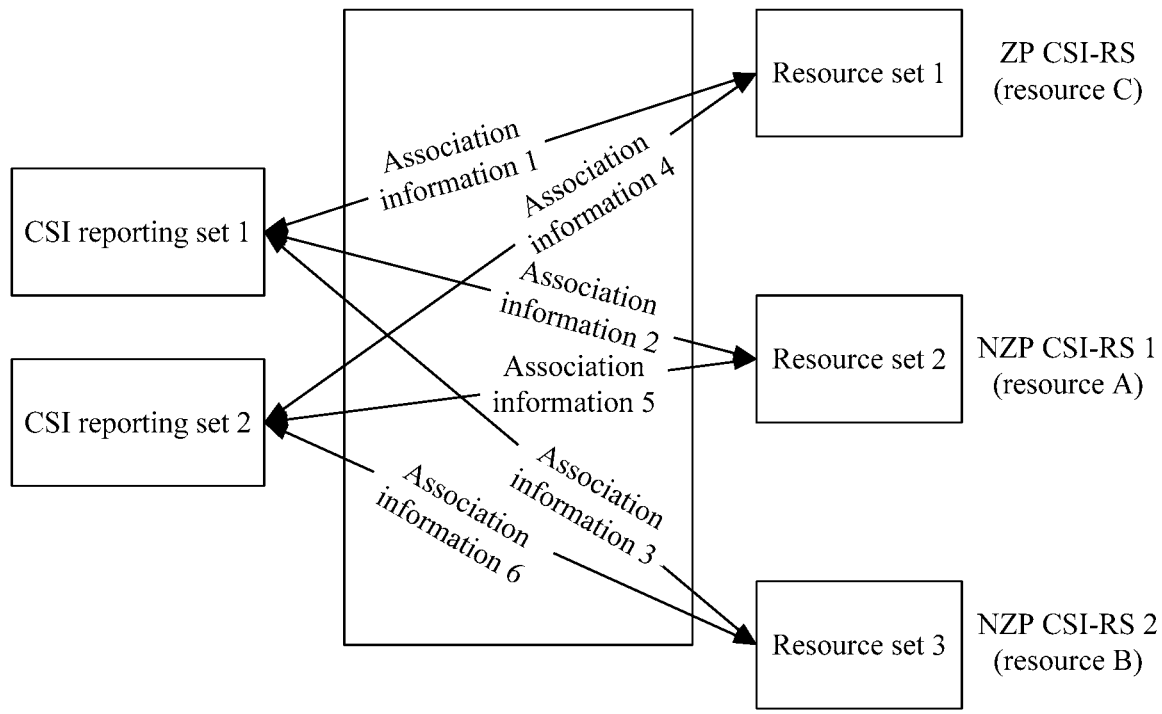
FIG. 2 is a schematic diagram of a relationship between channel measurement configurations according to an embodiment of this application.

For example, as shown in FIG. 2, FIG. 2 shows the foregoing three sets corresponding to two network devices. For example, channel state information measurement for a network device 1 may be performed by using a CSI reporting set 1, a resource set 1, a resource set 2, a resource set 3, and a CSI measurement set 1. The CSI measurement set 1 includes association information (link) 1, 2, and 3.

Channel state information measurement for a network device 2 may be performed by using a CSI reporting set 2, the resource set 1, the resource set 2, the resource set 3, and the CSI measurement set 1. The CSI measurement set 1 includes association information (link) 4, 5, and 6.

Figure 3:
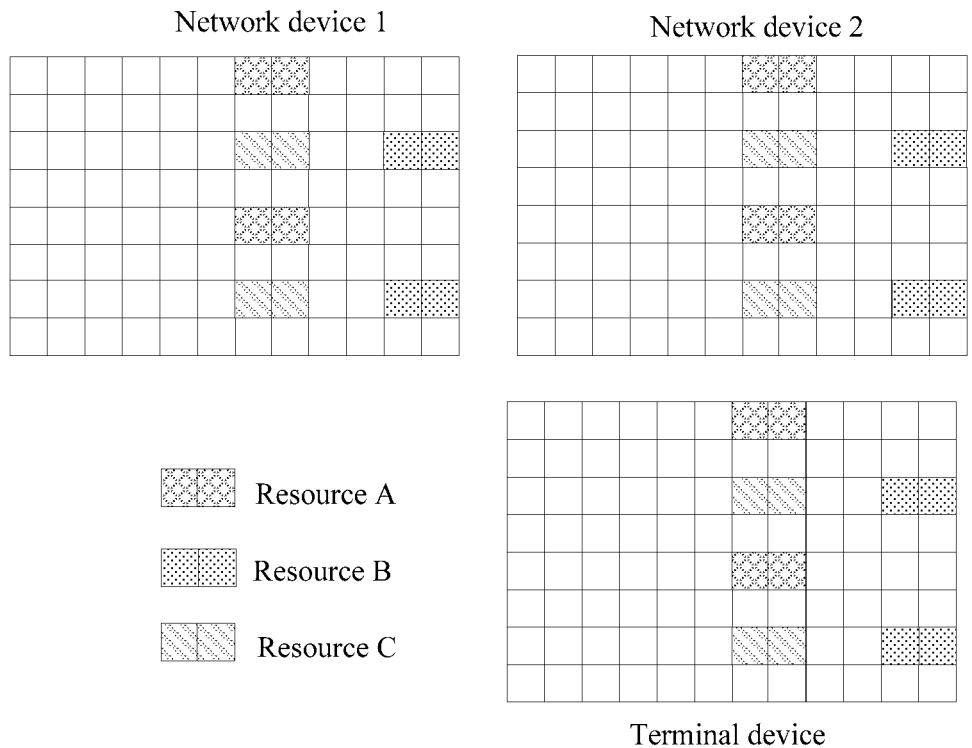
FIG. 3 is a schematic diagram of resource configuration patterns according to an embodiment of this application.

As shown in FIG. 3, to measure a channel of the network device 1, a resource set 1 is configured for state information of the channel of the network device 1, and to measure a channel of the network device 2, a resource set 2 is configured for state information of the channel of the network device 2. The resource set 1 and the resource set 2 each include resources A, B, and C. The resource A and the resource B are NZP CSI-RS resources (non-zero power CSI-RS resource). The network device 1 sends a CSI-RS on the resource A, and the network device 2 sends a CSI-RS on the resource B. The resource C is a ZP CSI-RS resource (zero power CSI-RS resource).

The network device 1 may transmit a CSI-RS based on a CSI-RS pattern that is shown in FIG. 3 and that corresponds to the network device 1, and the network device 2 may transmit a CSI-RS based on a CSI-RS pattern that is shown in FIG. 3 and that corresponds to the network device 2.

As shown in FIG. 3, on REs corresponding to the resource A, the network device 1 transmits an NZP CSI-RS, and the network device 2 is silent; and on REs corresponding to the resource B, the network device 1 is silent, and the network device 2 transmits an NZP CSI-RS.

The terminal device may perform downlink channel measurement and interference measurement based on the foregoing two configurations, to determine a CQI corresponding to the resource set 1 and a CQI corresponding to the resource set 2.

In an existing solution, the terminal device reports one CQI for each of the two network devices. In the embodiments of this application, the terminal device may perform joint measurement to obtain one CQI, or jointly report CSI based on the two obtained CQIs, for example, report one CQI (where the CQI may be either of the two CQIs; or may be generated based on the two CQIs, for example, may be an average value of the two CQIs), or report one of the CQIs and a difference between the two CQIs.

The following further describes in detail the solutions provided in the embodiments of this application with reference to the accompanying drawings.

Figure 4:
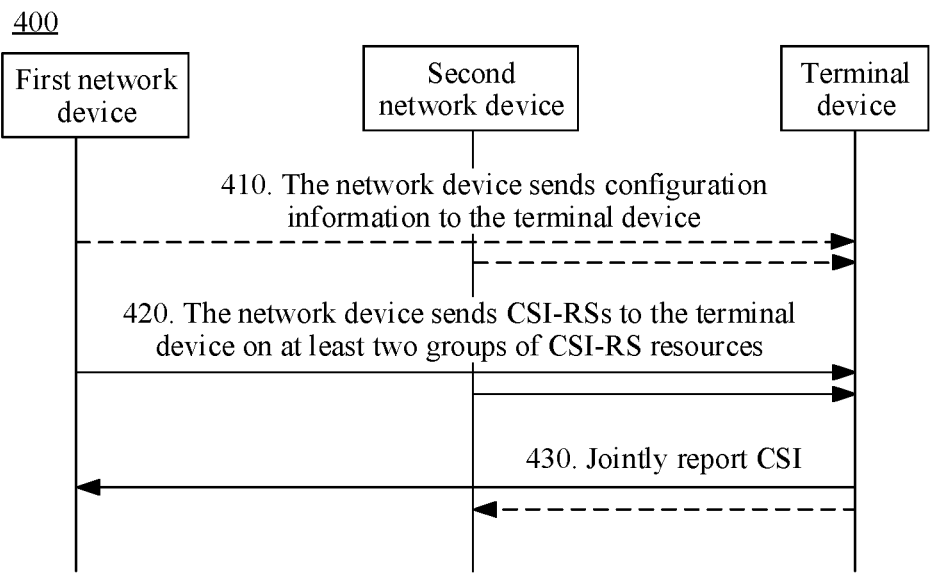
FIG. 4 is a schematic flowchart of a communication method according to an embodiment of this application.

FIG. 4 is a schematic flowchart of a control information transmission method according to an embodiment of this application. The method shown in FIG. 4 includes the following steps.

410. A network device sends configuration information to a terminal device.

For example, a first network device in two network devices in joint transmission sends the configuration information. Correspondingly, the terminal device receives the configuration information. The configuration information is used to instruct the terminal device to jointly report channel state information CSI for at least two groups of channel state information-reference signal CSI-RS resources.

It should be understood that in this embodiment of this application, joint CSI reporting may be that the terminal device performs joint measurement for the at least two groups of CSI-RS resources, and reports one piece of CSI or a plurality of pieces of CSI, where when the plurality of pieces of CSI are reported, there is a same CQI in the plurality of pieces of CSI. Specifically, because the terminal device may obtain only one CQI during joint measurement, the terminal device may report the CSI, where the CSI includes the CQI, or may report CSI for each group of CSI-RS resources, where each piece of CSI includes the CQI.

Optionally, joint CSI reporting may be that the terminal device performs separate measurement for the at least two groups of CSI-RS resources, and reports one piece of CSI (the CSI includes one CQI) or a plurality of pieces of CSI, where when the plurality of pieces of CSI are reported, there is a same CQI in the plurality of pieces of CSI. Specifically, because when performing separate measurement for the at least two groups of CSI-RS resources, the terminal device can obtain one CQI for each group of CSI-RS resources, in other words, the terminal device can obtain a plurality of CQIs, one CQI in joint reporting may be a CQI determined by the terminal device based on the plurality of CQIs, for example, a largest value in, a smallest value in, or an average value of the plurality of CQIs.

Optionally, joint CSI reporting may be that the terminal device performs separate measurement for the at least two groups of CSI-RS resources, and reports a plurality of CQIs, where one of the plurality of CQIs reported by the terminal device is a reference CQI in a plurality of CQIs that can be obtained by the terminal device and the other CQI is a difference between the other CQI and the reference CQI. In this case, the reported plurality of CQIs may be reported by the terminal device via one or more pieces of CSI. This embodiment of this application is not limited thereto.

It should be understood that in this embodiment of this application, one group of CSI-RS resources (which may also be referred to as one CSI-RS resource) may be a resource used by the terminal device for channel measurement. For example, one group of CSI-RS resources is a resource carrying an NZP CSI-RS. Optionally, one group of CSI-RS resources may be one resource set described above, or may be some resources in one resource set. Optionally, one group of CSI-RS resources may correspond to one CSI-RS resource identifier, for example, an NZP CSI-RS resource ID1, and another group of CSI-RS resources corresponds to another CSI-RS resource identifier, for example, an NZP CSI-RS resource ID2. Optionally, one group of CSI-RS resources corresponds to a first CSI-RS resource identifier, for example, an NZP CSI-RS resource ID3, another group of CSI-RS resources corresponds to one group of antenna ports in a second CSI-RS resource identifier, for example, one group of antenna ports in an NZP CSI-RS resource ID4, and another group of CSI-RS resources corresponds to another group of antenna ports in the second CSI-RS resource identifier, for example, another group of antenna ports in the NZP CSI-RS resource ID4. Optionally, one group of CSI-RS resources may correspond to one group of antenna ports in one CSI-RS resource identifier, and another group of CSI-RS resources corresponds to another group of antenna ports in the CSI-RS resource identifier. Optionally, when the at least two groups of CSI-RS resources correspond to at least two groups of antenna ports in one CSI-RS resource identifier, QCL indication information is configured for each group of antenna ports.

It should be understood that in this embodiment of this application, when the terminal performs channel measurement based on the at least two groups of CSI-RS resources, a CQI in jointly reported CSI may be determined by the terminal device after the terminal device performs comprehensive measurement based on the at least two groups of CSI-RS resources and another resource configured for interference measurement.

It should be understood that in this embodiment of this application, the "antenna port" may be a logical antenna port, and may also be referred to as an "antenna port array", an "antenna array", or a "subarray" in some scenarios. This is not limited in this embodiment of the present disclosure.

It should be understood that for a definition of QCL in this embodiment of this application, refer to a definition in LTE. To be specific, signals sent from QCL antenna ports experience same large-scale fading, where the large-scale fading includes a delay spread, a Doppler spread, a Doppler frequency shift, an average channel gain, and an average delay. However, this embodiment of this application is not limited thereto. For example, the large-scale fading may further include spatial information such as an angle of departure (AOD), an angle of arrival (AOA), a channel-related matrix, and a power spread spectrum. Further, for the definition of the QCL, refer to a related definition in future 5G.

It should be noted that in this embodiment of this application, the at least two groups of CSI-RS resources may be configured by the network device via higher layer signaling or physical layer signaling. The higher layer signaling may be radio resource control (RRC) signaling, medium access control (MAC) control element (CE) signaling, or other signaling. This is not specifically limited herein. The physical layer signaling may be downlink control information or the like. This is not limited in this embodiment of the present disclosure.

It should be further understood that the network device sending the configuration information may be either of the network devices in joint transmission, for example, the first network device or a second network device in joint transmission. Optionally, the configuration information may be sent by a network device other than the network devices in joint transmission. For example, the configuration information is sent by a third network device. This embodiment of the present disclosure is not limited thereto.

Specifically, the configuration information may be sent by the network device via higher layer signaling. For example, the network device sends the configuration information via radio resource control (RRC) signaling or medium access control (MAC) signaling. The network device may alternatively send the configuration information via other signaling. This embodiment of the present disclosure is not limited thereto.

It should be understood that the configuration information may be separate information; or may be the CSI reporting set (CSI reporting setting) described above, to be specific, the network device may make such a configuration in the CSI reporting set that the terminal device performs joint reporting.

The following describes in detail specific content of the configuration information in this embodiment of this application with reference to specific examples.

Optionally, in an embodiment, the configuration information includes one of the following seven types of content: a correspondence between the at least two groups of CSI-RS resources and a same CSI reporting set; an association relationship between the at least two groups of CSI-RS resources, where the association relationship between the at least two groups of CSI-RS resources includes an association relationship between identifiers of the at least two groups of CSI-RS resources or an association relationship between antenna ports of the at least two resources; an association relationship between CSI reporting sets corresponding to the at least two groups of CSI-RS resources; an association relationship between association information corresponding to the at least two groups of CSI-RS resources; resource triggering information, where the resource triggering information is used to trigger a reporting set, a resource set, or association information of the at least two groups of CSI-RS resources; indication information used to indicate that channel state information needs to be jointly reported for at least one of a reporting set, a resource set, or association information of a CSI-RS resource; or the configuration information includes a resource set of one group of the at least two groups of CSI-RS resources, where the resource set includes identification information or antenna port information of the other group of the at least two groups of CSI-RS resources or a reporting set, a resource set, or association information corresponding to the other group of CSI-RS resources.

The following describes the configuration information in this embodiment of this application in seven cases for the foregoing seven types of content.

Case 1:

The configuration information includes the correspondence between the at least two groups of CSI-RS resources and the same CSI reporting set.

Specifically, the network device may configure a plurality of pieces of channel measurement association information for the terminal device. For example, for two groups of CSI-RS resources, the network device configures an NZP CSI-RS resource identifier 1 for a first group of CSI-RS resources and an NZP CSI-RS resource identifier 2 for a second group of CSI-RS resources for the terminal device.

In addition, the network device configures association information 1 (Link 1) of the first group of CSI-RS resources, where the association information 1 is used to indicate that the NZP CSI-RS resource identifier 1 corresponds to a CSI reporting set 1 (CSI reporting setting ID1); and configures association information 2 (Link 2) of the second group of CSI-RS resources, where the association information 2 is used to indicate that the NZP CSI-RS resource identifier 2 corresponds to the CSI reporting set 1 (CSI reporting setting ID1).

A specific form is as follows:

Link 1: NZP CSI-RS resource ID1 CSI reporting setting ID1

Link 2: NZP CSI-RS resource ID2 CSI reporting setting ID1

The network device configures that the two groups of CSI-RS resources correspond to the same CSI reporting set, to instruct the terminal device to perform joint reporting for the two groups of resources.

Therefore, after the terminal device obtains the configuration, because the first group of resources and the second group of resources correspond to the same CSI reporting set, the terminal device jointly reports CSI, for example, reports one CQI, when performing measurement for the resources (namely, the at least two groups of CSI-RS resources) of the channel association information.

It may be understood that in the embodiments of this application, an NZP CSI-RS resource identifier may be a CSI-RS resource identifier, a resource identifier, a resource set identifier, or a resource configuration identifier. This is not specifically limited herein.

Therefore, in this embodiment of this application, the configuration information is used to instruct the terminal device to perform joint reporting, for example, report one CQI, for two groups of CSI-RS resources. This avoids a prior-art problem caused by separately measuring CSI for all transmission points and feeding back CSI by a terminal device. In addition, in this embodiment of this application, only one CQI may be reported for a plurality of groups of CSI-RS resources, and therefore control signaling overheads can be reduced, and coordinated transmission of a plurality of transmission points is implemented through scheduling for a case in which different data streams of different transmission points are transmitted for one code word.

Case 2:

The configuration information includes the association relationship between the at least two groups of CSI-RS resources, where the association relationship between the at least two groups of CSI-RS resources includes the association relationship between the identifiers of the at least two groups of CSI-RS resources or the association relationship between the antenna ports of the at least two groups of resources.

It should be understood that in this embodiment of this application, the association relationship may also be expressed as a dependency relationship or a subordinate relationship between the at least two groups of resources, or may also be expressed as that the at least two groups of resources are associated or that joint reporting needs to be performed for the at least two groups of resources, and the terminal device may jointly report CSI for the at least two groups of resources based on the association relationship.

Specifically, each group of CSI-RS resources may correspond to one identifier, for example, an NZP CSI-RS resource ID. For example, a first group of CSI-RS resources may correspond to an NZP CSI-RS resource ID1, and a second group of CSI-RS resources may correspond to an NZP CSI-RS resource ID2.

In this case, the configuration information may include the association relationship between the at least two groups of CSI-RS resources, for example, include an association relationship between the NZP CSI-RS resource ID1 and the NZP CSI-RS resource ID2.

Alternatively, each group of CSI-RS resources may correspond to one antenna port identifier, and one antenna port identifier may correspond to one or more antenna ports. For example, a first group of CSI-RS resources may correspond to an antenna port identifier 1, and a second group of CSI-RS resources may correspond to an antenna port identifier 2.

In this case, the configuration information may include the association relationship between the at least two groups of CSI-RS resources, for example, include an association relationship between the antenna port identifier 1 and the antenna port identifier 2.

For example, the configuration information includes an association relationship "dependency indication", to associate the NZP CSI-RS resource identifier 1 with the NZP CSI-RS resource identifier 2 as follows:

dependency indication: NZP CSI-RS resource ID1 NZP CSI-RS resource ID2

The network device instructs, by using an association relationship between two groups of CSI-RS resources, the terminal device to perform joint reporting for the two groups of CSI-RS resources.

Therefore, after the terminal device obtains the configuration information, the terminal device jointly reports CSI, for example, reports one CQI, for the associated two groups of CSI-RS resources based on the association relationship between the two groups of CSI-RS resources.

Therefore, in this embodiment of this application, the configuration information is used to instruct the terminal device to perform joint reporting, for example, report one CQI, for two groups of CSI-RS resources. This avoids a prior-art problem caused by separately measuring CSI for all transmission points and feeding back CSI by a terminal device. In addition, in this embodiment of this application, only one CQI may be reported for a plurality of groups of CSI-RS resources, and therefore control signaling overheads can be reduced, and coordinated transmission of a plurality of transmission points is implemented through scheduling for one code word.

Case 3:

The configuration information includes the association relationship between the CSI reporting sets corresponding to the at least two groups of CSI-RS resources.

Specifically, as described above, one group of CSI-RS resources may correspond to one CSI reporting set. For example, for two groups of CSI-RS resources, a first group of CSR-RS resources corresponds to a CSI reporting set 1, and a second group of CSI-RS resources corresponds to a CSI reporting set 2.

In this case, the configuration information may include an association relationship between the CSI reporting sets corresponding to the two groups of CSI-RS resources, for example, include an association relationship between the CSI reporting set 1 and the CSI reporting set 2.

For example, the configuration information includes an association relationship "dependency indication", to associate the CSI reporting set 1 with the CSI reporting set 2 as follows:

dependency indication: CSI reporting setting ID1 CSI reporting setting ID2

It may be understood that in the embodiments of this application, the CSI reporting set 1 may be a CSI reporting set identifier 1, or may be represented by using reporting set identification information. This is not specifically limited herein.

The network device instructs, by using an association relationship between reporting sets of two groups of CSI-RS resources, the terminal device to perform joint reporting for the two groups of resources.

Therefore, after the terminal device obtains the configuration, the terminal device jointly reports CSI, for example, reports one CQI, for the associated two groups of CSI-RS resources based on the association relationship between the reporting sets of the two groups of CSI-RS resources.

Therefore, in this embodiment of this application, the configuration information is used to instruct the terminal device to perform joint reporting, for example, report one CQI, for two groups of CSI-RS resources. This avoids a prior-art problem caused by separately measuring CSI for all transmission points and feeding back CSI by a terminal device. In addition, in this embodiment of this application, only one CQI may be reported for a plurality of groups of CSI-RS resources, and therefore control signaling overheads can be reduced, and coordinated transmission of a plurality of transmission points is implemented through scheduling for one code word.

Case 4:

The configuration information includes the association relationship between the association information corresponding to the at least two groups of CSI-RS resources.

Specifically, as described above, one group of CSI-RS resources may correspond to one or more pieces of association information (Link). For example, for two groups of CSI-RS resources, a first group of CSR-RS resources corresponds to an association information identifier 1, and a second group of CSR-RS resources corresponds to an association information identifier 2.

In this case, the configuration information may include an association relationship between the association information corresponding to the two groups of CSI-RS resources, for example, include an association relationship between the association information identifier 1 and the association information identifier 2.

For example, the configuration information includes an association relationship "dependency indication", to associate a CSI reporting set 1 with a CSI reporting set 2 as follows:

dependency indication: link 1 link 2

It may be understood that in the embodiments of this application, the association information identifier 1 may be association information 1, or may be represented by using association information identification information. This is not specifically limited herein.

The network device instructs, by using an association between association information of two groups of CSI-RS resources, the terminal device to perform joint reporting for the two groups of resources.

Therefore, after the UE receives the configuration information, the terminal device jointly reports CSI, for example, reports one CQI, for the associated two groups of CSI-RS resources based on the association relationship between the association information of the two groups of CSI-RS resources.

Therefore, in this embodiment of this application, the configuration information is used to instruct the terminal device to perform joint reporting, for example, report one CQI, for two groups of CSI-RS resources. This avoids a prior-art problem caused by separately measuring CSI for all transmission points and feeding back CSI by a terminal device. In addition, in this embodiment of this application, only one CQI may be reported for a plurality of groups of CSI-RS resources, and therefore control signaling overheads can be reduced, and coordinated transmission of a plurality of transmission points is implemented through scheduling for one code word.

Case 5:

The configuration information includes the resource triggering information, where the resource triggering information is used to trigger the reporting set, the resource set, or the association information of the at least two groups of CSI-RS resources.

The network device triggers the at least two groups of CSI-RS resources by using the resource triggering information, to instruct the terminal device to perform joint reporting for the two groups of resources.

Therefore, after receiving the configuration information, when performing CSI measurement as instructed by the configuration information, the UE jointly reports CSI, for example, reports one CQI, for the at least two groups of CSI-RS resources triggered by the resource triggering information.

Therefore, in this embodiment of this application, the configuration information is used to instruct the terminal device to perform joint reporting, for example, report one CQI, for two groups of CSI-RS resources. This avoids a prior-art problem caused by separately measuring CSI for all transmission points and feeding back CSI by a terminal device. In addition, in this embodiment of this application, only one CQI may be reported for a plurality of groups of CSI-RS resources, and therefore control signaling overheads can be reduced, and coordinated transmission of a plurality of transmission points is implemented through scheduling for one code word.

Case 6:

The configuration information includes the indication information used to indicate that channel state information needs to be jointly reported for at least one of a reporting set, a resource set, or association information of a CSI-RS resource.

Specifically, the network device may configure one piece of indication information for each group of CSI-RS resources. For example, a reporting set, a resource set, or association information of each group of CSI-RS resources corresponds to one piece of indication information.

For example, the indication information may be joint CQI identification information (a joint CQI flag). Each group of CSI-RS resources corresponds to one value of the indication information.

The network device may set, to a same value (e.g., 1 or 0), indication information of CSI-RS resources for which joint reporting needs to be performed, to instruct the terminal device to jointly report CSI for the resources whose indication information has the same value.

Alternatively, the network device may make such a setting that joint reporting needs to be performed for CSI-RSs whose indication information values fall within a same set range. For example, when values of indication information corresponding to the at least two groups of CSI-RS resources are greater than a preset threshold or less than a preset threshold, the terminal device is instructed to jointly report CSI for the at least two groups of CSI-RS resources.

Therefore, after receiving the configuration information, the UE jointly reports CSI, for example, reports one CQI, for the indicated two groups of CSI-RS resources as instructed by the configuration information.

Therefore, in this embodiment of this application, the configuration information is used to instruct the terminal device to perform joint reporting, for example, report one CQI, for two groups of CSI-RS resources. This avoids a prior-art problem caused by separately measuring CSI for all transmission points and feeding back CSI by a terminal device. In addition, in this embodiment of this application, only one CQI may be reported for a plurality of groups of CSI-RS resources, and therefore control signaling overheads can be reduced, and coordinated transmission of a plurality of transmission points is implemented through scheduling for one code word.

Case 7:

The configuration information includes a reporting set of a first group of the at least two groups of CSI-RS resources, and the reporting set includes identification information or antenna port information of the other group of the at least two groups of CSI-RS resources.

For example, identification information or antenna port information of a second group of CSI-RS resources is indicated in the configuration information of the first group of CSI-RS resources. The network device may configure the identification information or the antenna port information of the other group of CSI-RS resources in the reporting set of the first group of CSI-RS resources, to instruct the terminal device to jointly report CSI for the at least two groups of resources.

Optionally, the configuration information includes a resource set of one group of the at least two groups of CSI-RS resources, and the resource set includes a reporting set, a resource set, or association information corresponding to the other group of the at least two groups of CSI-RS resources.

For example, a reporting set, a resource set, or association information corresponding to a second group of CSI-RS resources is indicated in configuration information of a first group of CSI-RS resources.

Optionally, the configuration information includes a reporting set corresponding to one group of the at least two groups of CSI-RS resources, and the reporting set includes a reporting set, a resource set, or association information corresponding to the other group of the at least two groups of CSI-RS resources.

For example, a reporting set, a resource set, or association information corresponding to a second group of CSI-RS resources is indicated in a reporting set corresponding to a first group of CSI-RS resources.

Therefore, after receiving the configuration information, the UE jointly reports CSI, for example, reports one CQI, for the at least two groups of resources as instructed by the configuration information.

Therefore, in this embodiment of this application, the configuration information is used to instruct the terminal device to perform joint reporting, for example, report one CQI, for the at least two groups of CSI-RS resources. This avoids a prior-art problem caused by separately measuring CSI for all transmission points and feeding back CSI by a terminal device. In addition, in this embodiment of this application, only one CQI may be reported for a plurality of groups of CSI-RS resources, and therefore control signaling overheads can be reduced, and coordinated transmission of a plurality of transmission points is implemented through scheduling for one code word.

For the foregoing case 1 to case 7, when jointly reporting the CSI, the terminal device may report only one CQI, or may report a plurality of CQIs. The one CQI or the plurality of CQIs may be reported in the manner described above. Details are described in the following step 430, and are not described herein.

Optionally, in another embodiment, in this embodiment of the present disclosure, the configuration information may include a reporting set of CSI-RS resources in the at least two groups of CSI-RS resources, the reporting set includes same-CQI feedback indication information, and the same-CQI feedback indication information is used to indicate that CQIs included in CSI that the terminal device needs to feed back for the CSI-RS resources have a same value.

The terminal device may report, as instructed by the configuration information, a plurality of pieces of CSI in one-to-one correspondence to the at least two groups of CSI-RS resources, where CQIs included in the plurality of pieces of CSI have a same value.

Therefore, the terminal device may report a same CQI for the at least two groups of CSI-RS resources as instructed by the configuration information.

Therefore, in this embodiment of this application, a plurality of same CQIs are reported for a plurality of CSI-RS resources. This can resolve a prior-art problem caused by different values of a plurality of CQIs, so that the network device can accurately determine a modulation and coding scheme. In addition, a CQI is reported for each group of CSI-RSs, so that a quantity of bits for CSI feedback for one CSI reporting setting can be kept the same as that in the prior art, and this embodiment of this application can be compatible with the prior art, thereby reducing impact on an existing protocol.

Optionally, in another embodiment, in this embodiment of the present disclosure, the configuration information may include indication information of a reference resource, and the indication information of the reference resource is used to indicate at least one of the following information corresponding to one group of the at least two groups of CSI-RS resources: resource identification information, association information identification information, and reporting set identification information.

The terminal device may determine the reference resource based on the indication information of the reference resource. When jointly reporting the CSI as instructed by the configuration information, the terminal device may report a CQI (which may be referred to as a baseline) of the reference resource and a CQI difference corresponding to the other group of resources, where the CQI difference is a difference between a CQI of the other group of resources and the CQI of the reference resource.

Therefore, based on a configuration of the network device, the terminal device may perform measurement for the at least two groups of CSI-RS resources, and jointly report the CSI. Because when the CSI is reported, only a baseline CQI value and the CQI difference corresponding to the other group of resources are reported, compared with that all CQI values are reported in an existing solution, resource overheads can be reduced, and network performance can be improved.

420. The network device sends CSI-RSs to the terminal device on at least two groups of CSI-RS resources.

For example, the first network device sends a CSI-RS on a first group of CSI-RS resources, and the second network device sends a CSI-RS on a second group of CSI-RS resources.

Correspondingly, the terminal device receives the CSI-RSs carried on the at least two groups of CSI-RS resources.

430. The terminal device jointly reports CSI based on a result of measuring the CSI-RSs carried on the at least two groups of CSI-RS resources.

Optionally, the terminal device may report the CSI to the first network device, or the terminal device reports the CSI to the second network device, or the terminal device reports the CSI to both the first network device and the second network device. This embodiment of this application is not limited thereto.

It should be understood that the CSI jointly reported by the terminal device may specifically include one CQI, a plurality of CQIs, or one baseline CQI and one or more CQI differences.

It should be understood that after the network device obtains the CSI jointly reported by the terminal device, the network device may modulate and code a same code word based on the CSI, and send the modulated and coded code word to the terminal device by using at least two data streams, where one data stream may correspond to one group of QCL antenna ports. Correspondingly, the terminal device receives the plurality of data streams for the same code word, where antenna ports of one data stream meet a QCL relationship, and antenna ports of different data streams do not meet the QCL relationship. For example, when there are two data streams, one data stream may correspond to one group of QCL antenna ports. Alternatively, when there are more than two data streams, each data stream may correspond to one group of QCL antenna ports, or the more than two data streams may be grouped into a plurality of groups, data streams in each group correspond to one QCL antenna port, and data streams in different groups do not meet the QCL relationship. One group of data streams includes one or more data streams.

It should be noted that when the CSI jointly reported by the terminal device includes one CQI, the network device may directly perform modulation and coding by using the CQI and send a plurality of streams of a same code word. Optionally, when the CSI reported by the terminal device includes a plurality of CQIs or includes at least one CQI and a CQI difference, the network device may determine, based on the CSI reported by the terminal device, one CQI for modulation and coding, and send a plurality of streams of a same code word. Specifically, the network device may determine one CQI in a plurality of manners. This is not limited in this embodiment of this application.

The following describes, in detail with reference to specific examples, specific forms in which the terminal device jointly reports a CQI in this embodiment of this application.

Form 1:

In an embodiment, in 430, the terminal device reports one CQI based on the result of measuring the CSI-RSs carried on the at least two groups of CSI-RS resources.

For example, a CQI is fed back on a full bandwidth. Assuming that the at least two groups of CSI-RS resources are M groups of CSI-RS resources, the terminal device may perform separate measurement for the M groups of resources, to obtain M CQIs in one-to-one correspondence to the M groups of resources, and the terminal device may report one CQI based on the M CQIs, where the CQI may be a largest value in, a smallest value in, or an average value of the M CQIs, or the like, or the CQI may be calculated or determined by using a function of the M CQIs.

For another example, a CQI is fed back on a full bandwidth. Assuming that the at least two groups of CSI-RS resources are M groups of CSI-RS resources, the terminal device may perform joint measurement for the M groups of resources, to obtain one CQI corresponding to the M groups of resources, and report the CQI.

Optionally, for example, a CQI is fed back on a subband. Each CSI-RS resource may include N subbands, where N is an integer greater than 1. It should be understood that in this embodiment of this application, one subband may include one or more RBGs, or may include one or more RBs.

In 430, the terminal device may report CSI corresponding to a subband having best performance in subbands meeting a target requirement in all subbands corresponding to the plurality of CSI-RS resources.

The subbands meeting the target requirement are subbands whose block error rates are less than a preset block error rate threshold (e.g., 0.1 or 0.2), and the subband having the best performance in the subbands meeting the target requirement is a subband having a highest throughput or a largest CQI value in the subbands meeting the target requirement.

Figure 5:
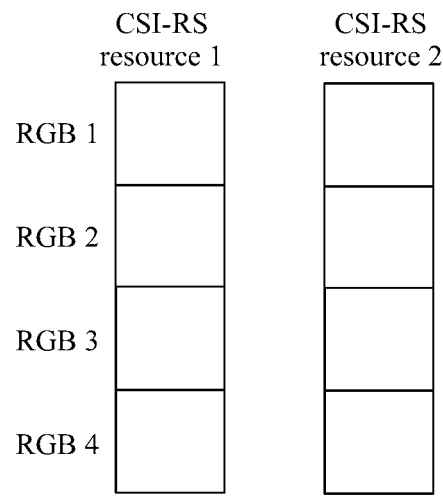
FIG. 5 is a schematic diagram of a CSI-RS resource according to an embodiment of this application.

For example, when measurement is performed for two CSI-RS resources, as shown in FIG. 5, the two groups of CSI-RS resources each include four subbands, each subband includes one resource block group (RBG), and the four subbands are an RBG 1 to an RBG 4.

The terminal device separately calculates block error rates of the four subbands with reference to the two CSI-RS resources, to determine subbands meeting a target requirement, for example, subbands whose block error rates are less than 0.1, for example, a subband 1 and a subband 4. Then, the terminal device selects a subband, for example, the subband 1, having a highest throughput, a largest MCS, or a largest CQI value from the subbands whose block error rates are less than 0.1.

Optionally, the terminal device may select a subband that meets a target requirement and that has best performance, for example, select a subband that meets the target requirement and that has a highest throughput or a largest CQI value.

For example, the terminal device calculates throughputs or CQIs of the four subbands with reference to the two CSI-RS resources when block error rates of the four subbands meet a requirement, to determine a subband that meets the target requirement and that has best performance. For example, when a block error rate is 0.1, the terminal device calculates the throughputs or the CQIs based on the block error rate, and then selects a subband that has a highest throughput or a largest CQI value and whose bit error rate meets a requirement. For example, when the requirement is that a bit error rate is 0.1, the terminal device learns, through calculation, that a CQI of a subband 1 is A, a CQI of a subband 2 is B, a CQI of a subband 3 is C, and a CQI of a subband 4 is D. Then, the terminal device determines values of A, B, C, and D, to select a subband corresponding to a largest CQI.

It may be understood that the target requirement may be alternatively another parameter measuring transmission performance, such as a bit error rate or a block error rate. A specific value of the target requirement may be predefined, or may be notified by the network device to the terminal via signaling. This is not specifically limited herein.

A throughput corresponding to a subband may be a sum of, an average value of, a largest value in, or a smallest value in throughputs of two groups of CSI-RS resources in the subband. A CQI corresponding to a subband is a sum of, an average value of, a largest value in, or a smallest value in values of CQIs of the two groups of CSI-RS resources in the subband. Similarly, a bit error rate corresponding to a subband is similar thereto, and details are not described.

Specifically, CSI that is reported by the terminal device and that is of a subband meeting a performance requirement may include one CQI. The CQI may be an average value of two CQIs that are of the two groups of CSI-RS resources and that correspond to the subband, either of the two CQIs, a largest value in the two CQIs, or a smallest value in the two CQIs. Optionally, the terminal device may report both of the two CQIs. Optionally, the terminal device may further report two PMIs corresponding to the subband. Optionally, the CSI that is reported by the terminal device and that is of the subband may further include the two PMIs corresponding to the two groups of resources.

Therefore, in this embodiment of this application, joint reporting is performed, to be specific, a CQI corresponding to one subband is reported, for two groups of CSI-RS resources. This avoids a prior-art problem caused by separately measuring CSI for all transmission points and feeding back CSI by a terminal device. In this embodiment of this application, only a CQI corresponding to one subband may be reported for a plurality of groups of CSI-RS resources, and therefore control signaling overheads can be reduced, and coordinated transmission of a plurality of transmission points is implemented through scheduling for one code word.

Form 2:

Alternatively, in another embodiment, the at least two groups of CSI-RS resources are M groups of CSI-RS resources, and each group of CSI-RS resources includes N subbands.

In 430, the terminal device reports, from the N subbands based on the result of measuring the CSI-RSs carried on the M groups of CSI-RS resources, CSI corresponding to a subband, in the N subbands, in which a difference between CQIs corresponding to different CSI-RS resources meets a requirement, where the requirement is that a CQI difference is the smallest, or that a CQI difference is less than or equal to a CQI difference threshold and a reference CQI has a largest value, wherein the reference CQI is a CQI used as a reference for comparison with CQIs in different subbands, and the reference CQI is a function of CQIs corresponding to different CSI-RS resources in a same subband.

Optionally, the function is one of the following: the reference CQI is a largest value in CQIs corresponding to different CSI-RS resources; the reference CQI is a smallest value in CQIs corresponding to different CSI-RS resources; or the reference CQI is an average value of CQIs corresponding to different CSI-RS resources.

It should be understood that the CQI difference threshold may be defined in a standard, in other words, the CQI difference threshold is pre-learned by the terminal device; or the CQI difference threshold is configured by the network device. This embodiment of this application is not limited thereto.

Figure 6:
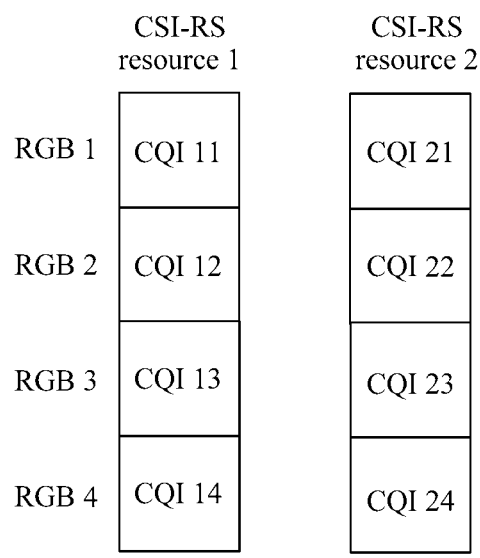
FIG. 6 is a schematic diagram of a CSI-RS resource according to another embodiment of this application.

For example, when measurement is performed for two CSI-RS resources, as shown in FIG. 6, the two groups of CSI-RS resources each include four subbands, each subband is one resource block group (RBG), and the four subbands are an RBG 1 to an RBG 4.

The terminal device may perform measurement for each group of resources, to obtain PMIs and CQIs of the subbands. The terminal device may select a subband corresponding to a smallest CQI difference for the plurality of groups of resources, for reporting. A CQI 11, a CQI 12, a CQI 13, and a CQI 14 are respectively obtained through calculation for four subbands of a first group of CSI-RS resources: an RBG 1, an RBG 2, an RBG 3, and an RBG 4. A CQI 21, a CQI 22, a CQI 23, and a CQI 24 are respectively obtained through calculation for four subbands of a second group of CSI-RS resources: an RBG 1, an RBG 2, an RBG 3, and an RBG 4.

The terminal device may calculate CQI differences $\Delta_1$ to $\Delta_4$ corresponding to the subbands, where:

$\Delta_1$=CQI11−CQI21

$\Delta_2$=CQI12−CQI22

$\Delta_3$=CQI13−CQI23

$\Delta_4$=CQI14−CQI24.

The terminal device may choose to report CSI of a subband corresponding to a smallest difference in the four differences. For example, the subband with the smallest difference is a subband 3. In this case, the terminal device reports CSI corresponding to the subband 3.

Therefore, in this embodiment of this application, joint reporting is performed, to be specific, a CQI corresponding to one subband is reported, for two groups of CSI-RS resources. This avoids a prior-art problem caused by separately measuring CSI for all transmission points and feeding back CSI by a terminal device.

Alternatively, in another embodiment, first, the terminal device may select subbands whose CQI differences are less than the CQI difference threshold.

For example, an ascending order of the four differences is $\Delta_3 < \Delta_2 < \Delta_1 < \Delta_4$, and differences less than the difference threshold are $\Delta_3$ and $\Delta_2$.

Then, the terminal device selects a subband from the subbands whose differences are less than the difference threshold, and feeds back CSI corresponding to the subband. For example, the terminal device may select a subband whose reference CQI has a largest value.

A reference CQI in a subband may be determined in the following several manners.

Manner 1: A larger value in CQIs of the two resources is used as the reference CQI. For example, a sequence of values of subbands corresponding to the subband 3 and a subband 2 is CQI 13>CQI 12>CQI 22>CQI 22. In this case, according to the manner 1, because a reference CQI, namely, the CQI 13, of the subband 3 is greater than a reference CQI, namely, the CQI 22, of the subband 2, the terminal device reports CSI of the subband 3 corresponding to the CQI 13.

Manner 2: A smaller value in CQIs of the two resources is used as the reference CQI. For example, a sequence of values of subbands corresponding to the subband 3 and a subband 2 is CQI 13>CQI 12>CQI 22>CQI 22. In this case, according to the manner 2, because a reference CQI, namely, the CQI 13, of the subband 3 is greater than a reference CQI, namely, the CQI 22, of the subband 2, the terminal device reports CSI of the subband 3 corresponding to the CQI 13.

Manner 3: An average value of CQIs of the two resources is used as the reference CQI. For example, average values of CQIs corresponding to the subband 3 and the subband 2 meet the following condition: An average value of the CQI 13 and the CQI 23 is greater than an average value of the CQI 12 and the CQI 22. In this case, according to the manner 3, the terminal device reports CSI corresponding to the subband 3 with the larger average value.

It should be noted that the following problem may exist when CSI corresponding to a subband with a relatively small difference is reported based on only differences: Although a difference between two CQIs corresponding to a subband is the smallest, values of the two CQIs may be relatively small (in other words, may not meet a requirement). Therefore, in this embodiment of this application, according to a maximum CQI principle, a subband is selected from subbands meeting a difference requirement and CSI of the subband is reported.

In this embodiment of this application, joint reporting is performed for two groups of CSI-RS resources. This avoids a prior-art problem caused by separately measuring CSI for all transmission points and feeding back CSI by a terminal device. In this embodiment of this application, a CQI corresponding to one subband may be reported for a plurality of groups of CSI-RS resources, and therefore control signaling overheads can be reduced, and coordinated transmission of a plurality of transmission points is implemented through scheduling for one code word.

Optionally, the CSI that is reported by the terminal device and that is of the subband may include T PMIs corresponding to the subband and P CQIs corresponding to the subband, or the CSI includes T PMIs corresponding to the subband, a CQI corresponding to one group of CSI-RS resources in the subband, and a CQI difference corresponding to the other group of CSI-RS resources, where the CQI difference is a difference between a CQI corresponding to the other group of CSI-RS resources and the CQI.

T is an integer not greater than M, P is an integer not less than 1 and not greater than M, and M is an integer not less than 2.

For example, according to the foregoing process, the terminal device determines to report the CSI corresponding to the subband 3, namely, the RBG 3. In this case, the terminal device may report either of the two CQIs corresponding to the RBG 3, for example, the CQI 13 or the CQI 23, or report an average value of the CQI 13 and the CQI 23. Optionally, the terminal device may report the difference Δ3 between the CQI 13 and the CQI 23. Optionally, the terminal device may report both of the two CQIs. Optionally, the terminal device may further report two PMIs corresponding to the subband.

It should be understood that the foregoing makes such a limitation that the CSI jointly fed back by the terminal device may include one CQI, or may include a plurality of CQIs. Optionally, the CSI jointly reported by the terminal device may further include at least one PMI.

A quantity of CQIs in the jointly reported CSI is determined based on a quantity of reporting sets or resource sets of the M groups of CSI-RS resources, or a quantity of CQIs in the CSI is determined based on a quantity of reported CQIs that is configured in a reporting set of the M groups of CSI-RS resources.

Optionally, if a quantity of CQIs obtained by the terminal device is greater than the configured quantity of reported CQIs, the terminal device may choose to report a CQI having a relatively large value, or choose to report a CQI having a relatively small value, or determine a value of a reported CQI based on information about the CSI-RS resources. For example, the terminal device reports a CQI for a CSI-RS resource corresponding to relatively small (or relatively large) identification information, reports a CQI for a CSI-RS resource corresponding to a relatively small (or relatively large) antenna port number, reports a CQI for a CSI-RS resource corresponding to relatively small (or relatively large) association information, or reports a CQI for a CSI-RS resource corresponding to relatively small (or relatively large) reporting set identification information. A specific reporting manner may be predefined in a protocol, or may be notified by the network device to the terminal device via signaling. This is not specifically limited herein.

A quantity of PMIs in the CSI is determined based on a quantity of pieces of channel measurement association information corresponding to the M groups of CSI-RS resources, or a quantity of PMIs in the CSI is determined based on a quantity of pieces of QCL indication information corresponding to the M groups of resources. Alternatively, a quantity of PMIs in the CSI is determined based on a quantity of resources for which PMIs need to be reported in the M groups of resources. For example, for a single-antenna CSI-RS resource, no PMI needs to be reported, and in this case, no PMI may need to be reported for the CSI-RS resource.

Optionally, the CSI may include S RIs, where S is an integer not greater than M. A quantity of RIs in the CSI is determined based on the quantity of pieces of channel measurement association information corresponding to the M groups of CSI-RS resources, or a quantity of RIs in the CSI is determined based on the quantity of pieces of QCL indication information corresponding to the M groups of resources. Alternatively, a quantity of RIs in the CSI is determined based on a quantity of resources for which RIs need to be reported in the M groups of resources. For example, for a single-antenna CSI-RS resource, no RI needs to be reported, or for a rank-restricted CSI-RS resource, no RI may need to be reported, and in this case, no RI may need to be reported for the CSI-RS resource.

Specifically, a feedback resource of the S RIs, T PMIs, and N CQIs may be at least one of a short-duration PUCCH, a long-duration PUCCH, and a PUSCH. When a plurality of CSI parameters are fed back together, priorities are predefined in a protocol. For example, first, the S RIs are fed back, then the T PMIs are fed back, and then the N CQIs are fed back. When a plurality of PMIs are fed back together, a joint coding manner may be used. Similarly, a plurality of RIs may be coded jointly, and a plurality of CQIs may be coded jointly. A plurality of jointly coded CSI parameters may have a same period and offset. A configuration method for a case in which "one resource has a plurality of QCLs" is described as follows:

For a case in which one group of CSI-RS resources include a plurality of groups of CSI-RS antenna ports, each group of CSI-RS antenna ports corresponds to one piece of QCL indication information. Each group of CSI-RS antenna ports includes one or more CSI-RS antenna ports.

Optionally, the network device may configure a plurality of pieces of QCL indication information for one CSI-RS resource, and there is a correspondence between QCL indication information and an antenna port or an antenna port group. For example, there is a one-to-one correspondence between QCL indication information and an antenna port or an antenna port group. For example, if there are two antenna ports or antenna port groups, and there are two pieces of QCL indication information, a first antenna port or antenna port group corresponds to a first piece of QCL indication information, and a second antenna port or antenna port group corresponds to a second piece of QCL indication information. For example, QCL indication information is configured for each antenna port or antenna port group. In this case, same or different QCL indication information may be configured for all antenna ports or antenna port groups. Specifically, for example, if one CSI-RS resource includes four antenna ports, QCL indication information 1 is configured for an antenna port 15, the QCL indication information 1 is configured for an antenna port 16, QCL indication information 2 is configured for an antenna port 17, and the QCL indication information 2 is configured for an antenna port 18. Details are as follows:

15 port: QCL 1; #16 port: QCL 1; #17 port: QCL 2; and #18 port: QCL 2.

Optionally, for example, if one CSI-RS resource includes two groups of QCL indication information, QCL indication information is configured for each group of antenna ports. For example, if antenna ports 15 and 16 are a first antenna port group, and antenna ports 17 and 18 are a second antenna port group, QCL indication information 1 is configured for the first antenna port group, and QCL indication information 2 is configured for the second antenna port group. Details are as follows:

15, #16 port: QCL 1; and #17, #18 port: QCL 2.

Alternatively, there is a one-to-many correspondence between QCL indication information and antenna ports or antenna port groups. For example, if there are two pieces of QCL indication information and four antenna ports, it may be considered that first QCL indication information corresponds to a first antenna port and a second antenna port, and second QCL indication information corresponds to a third antenna port and a fourth antenna port. For example, if there are two pieces of QCL indication information, and there are four antenna port groups, it may be considered that first QCL indication information corresponds to a first antenna port group and a second antenna port group, and second QCL indication information corresponds to a third antenna port group and a fourth antenna port group.

Further, optionally, there may be another correspondence. This is not limited herein. The correspondence may be a default correspondence, or may be notified by the network device to the terminal via signaling, for example, via higher layer signaling or physical layer signaling.

Form 3:

Optionally, in another embodiment, in 430, the terminal device reports, based on the result of measuring the CSI-RSs carried on the at least two groups of CSI-RS resources, a CQI of a reference resource and a CQI difference or difference indication information corresponding to the other group of resources. The reference resource is one group of the at least two groups of CSI-RS resources, the CQI difference is a difference between a CQI of the other group of CSI-RS resources and the CQI of the reference resource, and the difference indication information is used to indicate the difference between the CQI of the other group of CSI-RS resources and the CQI of the reference resource.

The configuration information includes indication information of the reference resource, the reference resource is determined by the terminal device based on the indication information of the reference resource, the indication information of the reference resource is used to indicate at least one of the following information corresponding to one group of the at least two groups of CSI-RS resources: resource identification information, association information identification information, and reporting set identification information.

When jointly reporting the CSI, the terminal device may report the CQI (which may be referred to as a baseline) of the reference resource and the CQI difference corresponding to the other group of resources, where the CQI difference is the difference between the CQI of the other group of resources and the CQI of the reference resource.

Optionally, in this embodiment of this application, the reference resource may not be indicated in the configuration information. For example, the reference resource is determined by the terminal device in the at least two groups of CSI-RS resources according to a predefined rule. For example, the preset rule is that a resource having a smallest (or largest) resource identifier, a smallest (or largest) antenna port number, a smallest (or largest) association information identifier, or a smallest (or largest) reporting set identifier is the reference resource. This embodiment of this application is not limited thereto.

For example, the preset rule is that a resource corresponding to a data stream in a least significant bit is a reference resource, and a CQI obtained by performing measurement for the resource corresponding to the data stream in the least significant bit is a baseline.

For example, the terminal device learns a group of CSI-RS resources and information about QCL DMRS antenna ports by reading higher layer or physical layer signaling. For example, the terminal device learns a CSI-RS resource #1 and that DMRS ports 7 and 8 are in QCL, and learns a CSI-RS resource #2 and that DMRS ports 9 and 10 are in QCL. In addition, a plurality of layers of data streams are mapped to DMRS ports in a particular sequence. For example, v layers of data are respectively mapped, in a sequence from 0 to v−1, to v DMRS ports whose port numbers are in ascending order. According to the foregoing specification that a CQI obtained by performing measurement for a CSI-RS resource corresponding to a data stream in a least significant bit is a baseline, because layers 0 and 1 are mapped to DMRSs 7 and 8, and layers 2 and 3 are mapped to DMRSs 9 and 10, according to the foregoing specification, the layers 0 and 1 in least significant bits are mapped to the DMRSs 7 and 8, and correspondingly a CQI obtained by performing measurement for the CSI-RS resource #1 is used as a baseline result for reporting.

Therefore, when jointly reporting the CSI, the terminal device may report the CQI corresponding to the reference resource and the CQI difference corresponding to the other group of resources.

For example, as shown in FIG. 6, two groups of CSI-RS resources each include four subbands, each subband is one resource block group (RBG), and the four subbands are an RBG 1 to an RBG 4.

The terminal device may perform measurement for each group of resources, to obtain PMIs and CQIs of the subbands. A CQI 11, a CQI 12, a CQI 13, and a CQI 14 are respectively obtained through calculation for four subbands of a first group of CSI-RS resources: an RBG 1, an RBG 2, an RBG 3, and an RBG 4. A CQI 21, a CQI 22, a CQI 23, and a CQI 24 are respectively obtained through calculation for four subbands of a second group of CSI-RS resources: an RBG 1, an RBG 2, an RBG 3, and an RBG 4.

For example, the CQIs corresponding to the first group of CSR-RS resources are baselines. The terminal device may calculate differences $\Delta_1$ to $\Delta_4$ that are between the CQIs of the second group of CSI-RS resources and the CQIs of the first group of CSI-RS resources and that correspond to the subbands, where:

$\Delta_1 = CQI11 - CQI21$ $\Delta_2 = CQI12 - CQI22$ $\Delta_3 = CQI13 - CQI23$ $\Delta_4 = CQI14 - CQI24.$ The terminal device may report the CQIs corresponding to the first group of CSI-RS resources and differences corresponding to the second group of CSI-RS resources, namely, the CQI 11, $\Delta_1$, the CQI 11, $\Delta_1$, the CQI 11, $\Delta_1$, the CQI 11, and $\Delta_1$.

It should be understood that the CQI difference in this embodiment of this application may be a quantized difference. After receiving the CSI, the network device may directly obtain the CQI difference without calculation or table lookup.

Alternatively, to reduce feedback overheads, the terminal device may quantize a difference. To be specific, when reporting a CQI, the terminal device may report the baseline CQI and difference information. The difference indication information is used to indicate the difference between the CQI of the other group of CSI-RS resources and the CQI of the reference resource.

Specifically, the terminal device reports the CQI of the reference resource and the difference information (e.g., a quantized value of the difference) corresponding to the other group of resources.

It should be understood that the terminal device may quantize the difference in a manner specified in a protocol, or quantize the difference in a manner configured by the network device. This is not limited in this embodiment of this application.

For example, the terminal device may quantize the difference based on Table 1.

TABLE 1

| Quantized value of a difference | Difference |
| --- | --- |
| 0 | 0 |
| 1 | 1 |
| 2 | ≥2 |
| 3 | ≤−1 |

For example, assuming that $\Delta_1=-2$, $\Delta_2=1$, $\Delta_3=2$, and $\Delta_4=0$, quantized values of $\Delta_1$ to $\Delta_4$ are respectively 3, 1, 2, and 0.

The terminal device may report the CQIs corresponding to the first group of CSI-RS resources and quantized values of the differences corresponding to the second group of CSI-RS resources, namely, the CQI 11, 3, the CQI 11, 1, the CQI 11, 2, the CQI 11, and 0.

It should be understood that the difference information in this embodiment of this application may be a value obtained after a difference is quantized. After receiving the CSI, the network device needs to obtain the CQI difference through calculation or table lookup.

It should be understood that the difference described above may be a value obtained by subtracting the CQI corresponding to the other group of resources from the baseline CQI, or may be a value obtained by subtracting the baseline CQI from the CQI corresponding to the other group of resources. This is not limited in this embodiment of this application.

Therefore, based on a configuration of the network device, the terminal device may perform measurement for the at least two groups of CSI-RS resources, and jointly report the CSI. Because when the CSI is reported, only the baseline CQI value and the difference corresponding to the other group of resources are reported, resource overheads can be reduced, and network performance can be improved.

Form 4:

Optionally, in another embodiment, the configuration information may include a reporting set of CSI-RS resources in the at least two groups of CSI-RS resources, the reporting set includes same-CQI feedback indication information, and the same-CQI feedback indication information is used to indicate that CQIs included in CSI that the terminal device needs to feed back for the CSI-RS resources have a same value.

The terminal device may report, as instructed by the configuration information, a plurality of pieces of CSI in one-to-one correspondence to the at least two groups of CSI-RS resources, where CQIs included in the plurality of pieces of CSI have a same value.

For example, when configuring a reporting set of a second group of CSI-RS resources, the network device indicates that a same CQI is to be fed back in the reporting set of the second group of CSI-RS resources as a reporting set of another resource such as a third group of CSI-RS resources. For example, the network device adds same-CQI feedback (same CQI report) indication information to a configuration of a reporting set #2 of the second group of CSI-RS resources, to indicate that a same CQI is to be fed back in the reporting set #2 of the second group of CSI-RS resources as a reporting set #3 of the third group of CSI-RS resources. For example, all CQIs fed back for the at least two groups of CSI-RS resources are the same as the CQI fed back for the third group of CSI-RS resources.

Therefore, the terminal device may report a same CQI for the at least two groups of CSI-RS resources as instructed by the configuration information.

Therefore, in this embodiment of this application, a plurality of CQIs having a same value are reported for a plurality of CSI-RS resources. This can resolve a prior-art problem caused by different values of a plurality of CQIs, so that the network device can accurately determine a modulation and coding scheme. In addition, a CQI is reported for each group of CSI-RSs, so that a quantity of bits for CSI feedback for one CSI reporting setting can be kept the same as that in the prior art, and this embodiment of this application can be compatible with the prior art, thereby reducing impact on an existing protocol.

It should be noted that the examples in the foregoing embodiment are merely used to help a person skilled in the art to understand this embodiment of this application, instead of limiting this embodiment of this application to the specific values or the specific scenarios in the examples. Apparently, a person skilled in the art may make various equivalent modifications or changes based on the provided examples, and the various modifications or changes also fall within the scope of the embodiments of this application.

Optionally, in an embodiment, in this embodiment of this application, during CSI measurement and reporting, a resource set, a reporting set, and a measurement set may be configured. The measurement set includes one or more pieces of association information.

When sending CSI measurement and reporting configuration information, the network device may configure only one piece of association information (link) for one resource set and one reporting set. Information in the link indicates that quantity is a channel or interference.

The network device sends resource configuration information of at least two CSI-RS resources.

The terminal device receives the resource configuration information of the at least two CSI-RS resources.

The terminal device/network device determines interference measurement behavior on a CSI-RS resource based on the received resource configuration information of the two CSI-RS resources.

Specifically, for example, the terminal device may determine an overlapping status of the CSI-RS resources based on the configuration information of the at least two CSI-RS resources, and then determine interference measurement behavior on an interference NZP CSI-RS resource.

The terminal device may determine, based on an overlapping status of an NZP CSI-RS resource used for channel measurement and an NZP CSI-RS resource used for interference measurement, interference measurement behavior on the NZP CSI-RS resource used for interference measurement.

The overlapping status of the NZP CSI-RS resource used for channel measurement (briefly referred to as channel NZP) and the NZP CSI-RS resource used for interference measurement (interference NZP) is an overlapping status determined based on resource configuration information of the two NZP CSI-RS resources.

Resource configuration information of a CSI-RS resource may include at least one of a resource identifier, an antenna port quantity/antenna port identifier, a time-frequency resource pattern, a subframe configuration, a scrambling identifier, QCL information, and the like, and each piece of the foregoing information may be referred to as one piece of sub configuration information.

Specifically, the overlapping status of the CSI-RS resources may be determined in the following several manners based on the configuration information of the at least two CSI-RS resources. Two NZP CSI-RS resources are used as an example:

Optionally, it is determined, based on the fact that the two NZP CSI-RS resources have same each piece of sub configuration information, that the two NZP CSI-RS resources overlap. In other words, that the two NZP CSI-RS resources overlap may mean that the two NZP CSI-RS resources have same each piece of sub configuration information.

Optionally, an overlapping status of the CSI-RS resources is determined based on resource identifiers of the two NZP CSI-RSs. For example, it is determined, based on the fact that the two NZP CSI-RS resources have a same resource identifier, that the two NZP CSI-RS resources overlap. In other words, because a resource identifier is an identifier uniquely identifying resource configuration information, that the two NZP CSI-RS resources overlap may mean that the two NZP CSI-RS resources have a same resource identifier.

Optionally, that the two NZP CSI-RS resources overlap may mean that the two NZP CSI-RS resources have same one piece or several pieces of sub configuration information. That the two NZP CSI-RS resources do not overlap may mean that the two NZP CSI-RS resources differ in one piece of sub configuration information. Specific sub configuration information may be predefined, or may be notified by the network device to the terminal via signaling. This is not specifically limited.

Optionally, that the two NZP CSI-RS resources do not overlap may mean that the two NZP CSI-RS resources differ in each piece of sub configuration information.

Optionally, that the two NZP CSI-RS resources do not overlap may mean that the two NZP CSI-RS resources have different resource identifiers. It may be understood that the terminal device may determine the interference measurement behavior on the interference NZP CSI-RS resource based on the configuration information of the at least two CSI-RS resources. A specific determining method is similar to the method for determining the overlapping status of the CSI-RS resources based on the configuration information of the at least two CSI-RS resources. Refer to the foregoing descriptions of determining the overlapping status of the CSI-RS resources. Details are not described herein.

The terminal device may determine the measurement behavior on the interference NZP CSI-RS resource based on the overlapping status of the channel NZP CSI-RS resource and the interference NZP CSI-RS resource.

Specifically, the interference measurement behavior may be measurement behavior of subtracting a wanted signal from a received signal, or may be interference measurement behavior of simulating interference, or may be other interference measurement behavior. This is not specifically limited herein.

Optionally, the interference measurement behavior of simulating interference includes: performing measurement on the interference NZP CSI-RS resource to obtain a channel matrix, and determining a precoding matrix based on a selection of UE or an indication of a base station, where a product of the channel matrix and the precoding matrix is interference; or performing measurement on the interference NZP CSI-RS resource to obtain an equivalent channel matrix, where the equivalent channel matrix is a product of a channel matrix and a precoding matrix.

Specifically, the measurement behavior on the interference NZP CSI-RS resource may be determined in the following manner based on the overlapping status of the channel NZP CSI-RS resource and the interference NZP CSI-RS resource.

For example, when the interference NZP CSI-RS resource and the channel NZP CSI-RS resource overlap, the measurement behavior of subtracting a wanted signal from a received signal is performed on the interference NZP CSI-RS resource. When the interference NZP CSI-RS resource and the channel NZP CSI-RS resource do not overlap, the interference measurement behavior of simulating interference is performed on the interference NZP CSI-RS resource. Configuration information of one NZP CSI-RS resource may be used to instruct to perform two types of measurement behavior based on indication information. For example, the configuration information is used to instruct to perform channel measurement on some antenna ports, on some time-frequency resources, or in some subframes in one NZP CSI-RS resource, or instruct to perform interference measurement on some antenna ports, on some time-frequency resources, or in some subframes in one NZP CSI-RS resource.

In this embodiment of the present disclosure, optionally, resource configuration information of one NZP CSI-RS resource may include more than one antenna port group, more than one time-frequency resource pattern, more than one subframe group, more than one scrambling identifier, or more than one piece of QCL information. Different antenna port groups may correspond to different QCL information, or measurement behavior is indicated for different antenna port groups. Different time-frequency resource patterns may correspond to different indication information. The indication information may be interference measurement and/or channel measurement information, or may be measurement behavior indication information, or may be QCL indication information. This is not specifically limited herein.

It should be understood that a CSI-RS resource may be a resource corresponding to one antenna port group, one time-frequency resource pattern, one subframe group, one scrambling identifier, or one piece of QCL information in one CSI-RS resource identifier.

Optionally, the terminal device may perform channel measurement by using one antenna port group/time-frequency resource pattern in one CSI-RS resource, and perform interference measurement by using another antenna port group/time-frequency resource pattern in the CSI-RS resource. One antenna port group may include one or more antenna ports.

Optionally, the terminal device may perform channel measurement by using one antenna port group/time-frequency resource pattern in one CSI-RS resource, and also perform interference measurement by using the antenna port group/time-frequency resource pattern. One antenna port group includes one or more antenna ports.

A specific selected antenna port group/time-frequency resource pattern may be notified by the network device to the terminal device via signaling, or may be predefined. This is not specifically limited herein.

Some sub configuration information in configuration information of one NZP resource used for channel measurement is selected/configured via physical layer signaling or higher layer signaling. For example, one antenna port group is selected via physical layer signaling or higher layer signaling, to perform channel measurement. For example, one time-frequency resource pattern is selected via physical layer signaling or higher layer signaling, to perform channel measurement. For example, one time-frequency resource pattern or one antenna port group is selected via physical layer signaling or higher layer signaling, to perform interference measurement. A mapping relationship between different sub configuration information may be configured or predefined. When the mapping relationship is configured, for example, an antenna port group 1 and a time-frequency resource pattern 2 are configured for channel measurement.

The physical layer signaling may be control information, for example, DCI. The higher layer signaling may be RRC signaling, MAC CE signaling, or other signaling. This is not specifically limited herein.

Only one link is configured for one resource setting and one reporting setting. A quantity in the link is a channel or interference. The UE determines, based on an overlapping status of NZP used for channel measurement and NZP used for interference measurement, interference measurement behavior on the NZP used for interference measurement. The overlapping status of the NZP used for channel measurement (briefly referred to as channel NZP) and the NZP used for interference measurement (interference NZP) is an overlapping status determined based on configurations of the two NZPs. A configuration of an NZP CSI-RS includes sub configuration information such as a resource identifier, an antenna port quantity/antenna port identifier, a time-frequency resource pattern, a subframe configuration, a scrambling identifier, and QCL information.

That the two NZPs overlap may mean that the two NZPs have same each piece of sub configuration information. Alternatively, because a resource identifier is an identifier uniquely identifying resource configuration information, that the two NZPs overlap may mean that the two NZPs have a same identifier. Alternatively, that the two NZPs overlap may mean that the two NZPs have same one piece or several pieces of sub configuration information. That the two NZPs do not overlap may mean that the two NZPs differ in one piece of sub configuration information. Alternatively, that the two NZPs do not overlap may mean that the two NZPs differ in each piece of sub configuration information. Alternatively, that the two NZPs do not overlap may mean that the two NZPs have different identifiers.

The UE may determine the measurement behavior on the interference NZP based on the overlapping status of the channel NZP and the interference NZP. For example, when the interference NZP and the channel NZP overlap, measurement behavior of subtracting a wanted signal from a received signal is performed on the interference NZP. When the interference NZP and the channel NZP do not overlap, interference measurement behavior of simulating interference is performed on the interference NZP. The interference measurement behavior of simulating interference includes: performing measurement on the interference NZP to obtain a channel matrix, and determining a precoding matrix based on a selection of UE or an indication of a base station, where a product of the channel matrix and the precoding matrix is interference; or performing measurement on the interference NZP to obtain an equivalent channel matrix, where the equivalent channel matrix is a product of a channel matrix and a precoding matrix.

Configuration information of one NZP CSI-RS resource may be used to instruct to perform two types of measurement behavior based on indication information. For example, the configuration information is used to instruct to perform channel measurement on some antenna ports, on some time-frequency resources, or in some subframes in one NZP CSI-RS resource, or instruct to perform interference measurement on some antenna ports, on some time-frequency resources, or in some subframes in one NZP CSI-RS resource.

Configuration information of one NZP CSI-RS resource may include more than one antenna port group, more than one time-frequency resource pattern, more than one subframe group, more than one scrambling identifier, or more than one piece of QCL information. Different antenna port groups may correspond to different QCL information, or measurement behavior is indicated for different antenna port groups. Different time-frequency resource patterns may correspond to different indication information. Some sub configuration information in configuration information of one NZP resource used for channel measurement is selected/configured via physical layer signaling or higher layer signaling. For example, one antenna port group is selected via DCI, to perform channel measurement. For example, one time-frequency resource pattern is selected via DCI, to perform channel measurement. For example, one time-frequency resource pattern or one antenna port group is selected via DCI, to perform interference measurement. A mapping relationship between different sub configuration information may be configured. For example, an antenna port group 1 and a time-frequency resource pattern 2 are configured for channel measurement.

It should be understood that this embodiment may be used as an independent embodiment, or may be combined with the foregoing embodiments. This embodiment of this application is not limited thereto.

The foregoing describes in detail the CSI reporting method in the embodiments of this application with reference to FIG. 1 to FIG. 6, and the following describes in detail devices in the embodiments of this application with reference to FIG. 7 to FIG. 10.

Figure 7:
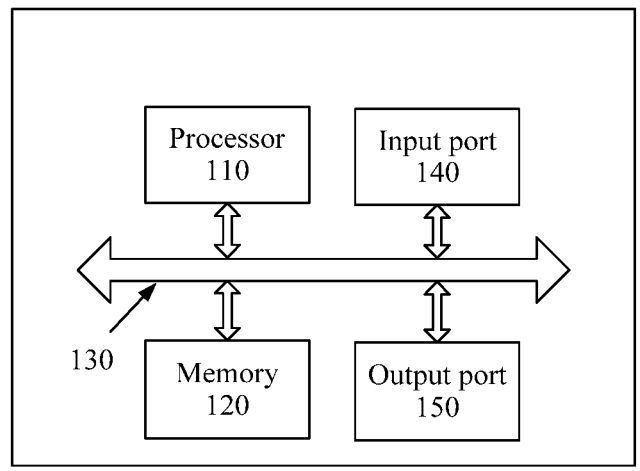
FIG. 7 is a schematic block diagram of a device according to an embodiment of this application.

Based on the foregoing method, FIG. 7 is a schematic diagram 1 of a device according to an embodiment of this application. As shown in FIG. 7, the device may be a terminal device 10, or may be a chip or a circuit, for example, a chip or a circuit that can be disposed in the terminal device. The terminal device 10 may correspond to the terminal device in the foregoing method.

The device may include a processor 110 and a memory 120. The memory 120 is configured to store an instruction, and the processor 110 is configured to execute the instruction stored in the memory 120, to implement the steps in the method corresponding to FIG. 4.

Further, the device may further include an input port 140 and an output port 150. Further, the device may include a bus system 130. The processor 110, the memory 120, the input port 140, and the output port 150 may be connected via the bus system 130.

The processor 110 is configured to execute the instruction stored in the memory 120, to control the input port 140 to receive a signal and control the output port 150 to send a signal, to implement the steps of the terminal device in the foregoing method. The input port 140 and the output port 150 may be a same physical entity or different physical entities. When the input port 140 and the output port 150 are a same physical entity, the input port 140 and the output port 150 may be collectively referred to as a transceiver. The memory 220 may be integrated into the processor 210, or the memory 220 and the processor 210 may be disposed separately.

In an implementation, functions of the input port 140 and the output port 150 may be considered to be implemented by using a transceiver circuit or a dedicated transceiver chip. The processor 110 may be considered to be implemented by using a dedicated processing chip, processing circuit, or processor, or a universal chip.

In another implementation, the terminal device provided in this embodiment of this application may be considered to be implemented by using a general-purpose computer. To be specific, program code for implementing functions of the processor 110, the input port 140, and the output port 150 is stored in the memory, and a general-purpose processor executes the code in the memory to implement the functions of the processor 110, the input port 140, and the output port 150.

For concepts, explanations, detailed descriptions, and other steps that are related to the device and the technical solution provided in this embodiment of this application, refer to the descriptions related to the content in the foregoing method or other embodiments. Details are not described herein again.

Figure 8:
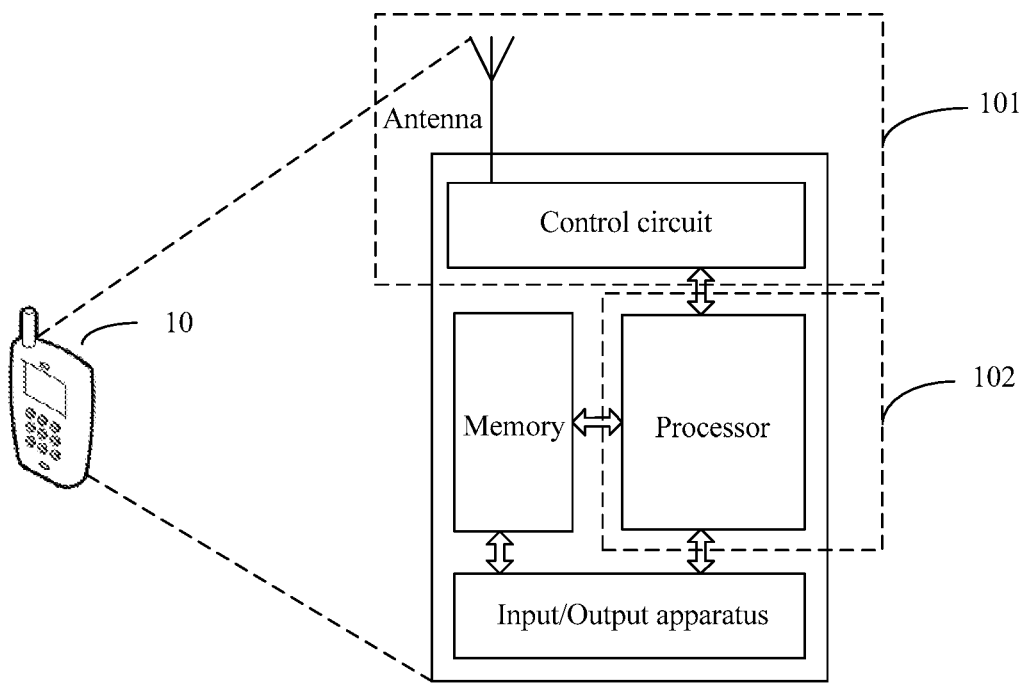
FIG. 8 is a schematic block diagram of a terminal device according to an embodiment of this application.

FIG. 8 is a schematic structural diagram of a terminal device according to this application. The terminal device is applicable to the system shown in FIG. 1. For ease of description, FIG. 8 shows merely main parts of the terminal device. As shown in FIG. 8, a terminal device 10 includes a processor, a memory, a control circuit, an antenna, and an input/output apparatus. The processor is mainly configured to: process a communications protocol and communication data, control the entire terminal device, execute a software program, and process data of the software program, for example, configured to support the terminal device in performing the actions described in the embodiment of the transmission precoding matrix indication method. The memory is mainly configured to store a software program and data. The control circuit is mainly configured to: perform conversion between a baseband signal and a radio frequency signal, and process the radio frequency signal. The control circuit and the antenna may be collectively referred to as a transceiver, and are configured to send and receive radio frequency signals in a form of an electromagnetic wave. The input/output apparatus, for example, a touchscreen, a display, or a keyboard, is mainly configured to: receive data entered by a user and output data to the user.

After the terminal device is powered on, the processor may read the software program in a storage unit, explain and execute an instruction in the software program, and process data of the software program. When data needs to be sent wirelessly, after performing baseband processing on the to-be-sent data, the processor outputs a baseband signal to a radio frequency circuit, and after performing radio frequency processing on the baseband signal, the radio frequency circuit sends a radio frequency signal in the form of an electromagnetic wave via the antenna. When data is sent to the terminal device, the radio frequency circuit receives a radio frequency signal via the antenna, converts the radio frequency signal into a baseband signal, and outputs the baseband signal to the processor; and the processor converts the baseband signal into data, and processes the data.

A person skilled in the art may understand that for ease of description, FIG. 8 shows only one memory and one processor. In an actual terminal device, there may be a plurality of processors and memories. The memory may also be referred to as a storage medium, a storage device, or the like. This is not limited in this embodiment of the present disclosure.

In an optional implementation, the processor may include a baseband processor and a central processing unit. The baseband processor is mainly configured to process a communications protocol and communication data. The central processing unit is mainly configured to: control the entire terminal device, execute a software program, and process data of the software program. The processor in FIG. 8 integrates functions of the baseband processor and the central processing unit. A person skilled in the art may understand that the baseband processor and the central processing unit may be processors independent of each other, and are interconnected by using a technology such as a bus. A person skilled in the art may understand that the terminal device may include a plurality of baseband processors to adapt to different network standards, the terminal device may include a plurality of central processing units to enhance a processing capability of the terminal device, and the parts of the terminal device may be connected via various buses. The baseband processor may also be expressed as a baseband processing circuit or a baseband processing chip. The central processing unit may also be expressed as a central processing circuit or a central processing chip. The function of processing the communications protocol and the communication data may be disposed inside the processor, or may be stored in the storage unit in a form of a software program, and the processor executes the software program to implement a baseband processing function.

For example, in this embodiment of the present disclosure, the antenna having sending and receiving functions and the control circuit may be considered as a transceiver unit 101 of the terminal device 10, and the processor having a processing function may be considered as a processing unit 102 of the terminal device 10. As shown in FIG. 8, the terminal device 10 includes the transceiver unit 101 and the processing unit 102. The transceiver unit may also be referred to as a transceiver, a transceiver machine, a transceiver apparatus, or the like. Optionally, a component configured to implement a receiving function in the transceiver unit 101 may be considered as a receiving unit, and a component configured to implement a sending function in the transceiver unit 101 may be considered as a sending unit. In other words, the transceiver unit 101 includes the receiving unit and the sending unit. For example, the receiving unit may also be referred to as a receiver, an input port, a receiving circuit, or the like, and the sending unit may be referred to as a transmitter, a transmitter, a transmit circuit, or the like.

Figure 9:
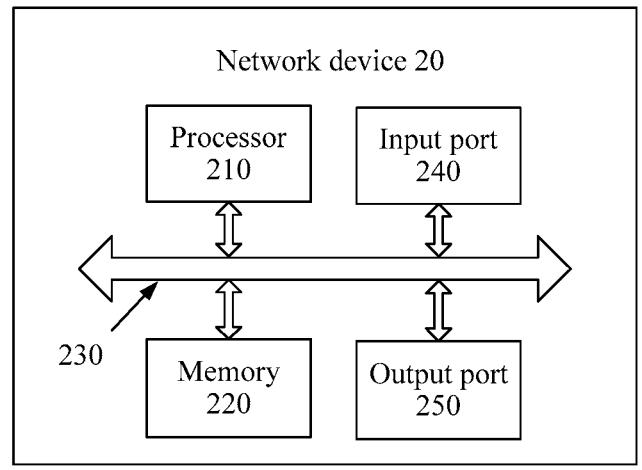
FIG. 9 is a schematic block diagram of a device according to an embodiment of this application.

Based on the foregoing method, FIG. 9 is a schematic diagram 2 of a device according to an embodiment of this application. As shown in FIG. 9, the device may be a network device 20, or may be a chip or a circuit, for example, a chip or a circuit that can be disposed in the network device. The network device 20 corresponds to the network device in the foregoing method. The device may include a processor 210 and a memory 220. The memory 220 is configured to store an instruction, and the processor 210 is configured to execute the instruction stored in the memory 220, so that the device implements the method corresponding to FIG. 4.

Further, the network device may include an input port 240 and an output port 250. Furthermore, the network device may include a bus system 230.

The processor 210, the memory 220, the input port 240, and the output port 250 are connected via the bus system 230. The processor 210 is configured to execute the instruction stored in the memory 220, to control the input port 240 to receive a signal and control the output port 250 to send a signal, to implement the steps of the network device in the foregoing method. The input port 240 and the output port 250 may be a same physical entity or different physical entities. When the input port 240 and the output port 250 are a same physical entity, the input port 240 and the output port 250 may be collectively referred to as a transceiver. The memory 220 may be integrated into the processor 210, or the memory 220 and the processor 210 may be disposed separately.

In an implementation, functions of the input port 240 and the output port 250 may be considered to be implemented by using a transceiver circuit or a dedicated transceiver chip. The processor 210 may be considered to be implemented by using a dedicated processing chip, processing circuit, or processor, or a universal chip.

In another implementation, the network device provided in this embodiment of this application may be considered to be implemented by using a general-purpose computer. To be specific, program code for implementing functions of the processor 210, the input port 240, and the output port 250 is stored in the memory, and a general-purpose processor executes the code in the memory to implement the functions of the processor 210, the input port 240, and the output port 250.

For concepts, explanations, detailed descriptions, and other steps that are related to the device and the technical solution provided in this embodiment of this application, refer to the descriptions related to the content in the foregoing method or other embodiments. Details are not described herein again.

Figure 10:
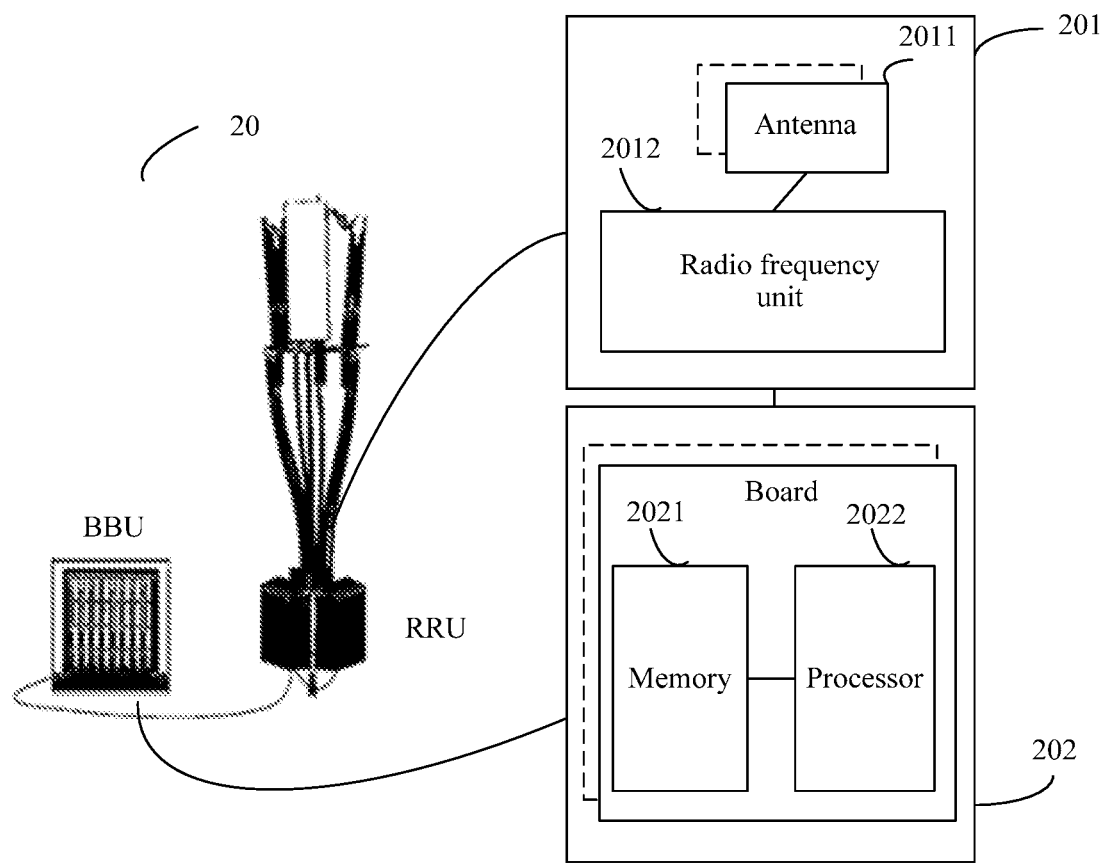
FIG. 10 is a schematic block diagram of a network device according to an embodiment of this application.

Based on the foregoing method, FIG. 10 is a schematic structural diagram of a network device according to an embodiment of this application, for example, may be a schematic structural diagram of a base station. As shown in FIG. 10, the base station may be applied to the system shown in FIG. 1. A base station 20 includes one or more radio frequency units such as a remote radio unit (RRU) 201 and one or more baseband units (baseband unit, BBU) (which may also be referred to as a digital unit (DU)) 202. The RRU 201 may be referred to as a transceiver unit, a transceiver machine, a transceiver circuit, a transceiver, or the like, and may include at least one antenna 2011 and a radio frequency unit 2012. The RRU 201 is mainly configured to: send and receive radio frequency signals and perform conversion between a radio frequency signal and a baseband signal, for example, configured to send the signaling message in the foregoing embodiment to a terminal device. The BBU 202 is mainly configured to: perform baseband processing, control the base station, and the like. The RRU 201 and the BBU 202 may be physically disposed together, or may be physically disposed separately, in other words, the base station 20 may be a distributed base station.

The BBU 202 is a control center of the base station, may also be referred to as a processing unit, and is mainly configured to implement a baseband processing function, for example, channel coding, multiplexing, modulation, and spreading. For example, the BBU (processing unit) may be configured to control the base station to perform the operation procedure related to the network device in the foregoing method embodiment.

In an example, the BBU 202 may include one or more boards, and a plurality of boards may jointly support a radio access network (for example, an LTE network) of a single access standard, or may separately support radio access networks of different access standards. The BBU 202 further includes a memory 2021 and a processor 2022. The memory 2021 is configured to store a necessary instruction and necessary data. For example, the memory 2021 stores the preset information and the like in the foregoing embodiment. The processor 2022 is configured to control the base station to perform a necessary action, for example, configured to control the base station to perform the operation procedure related to the network device in the foregoing method embodiment. The memory 2021 and the processor 2022 may serve one or more boards. In other words, a memory and a processor may be disposed on each board. Alternatively, a plurality of boards may share a same memory and a same processor. In addition, a necessary circuit may be further disposed on each board.

According to the method provided in the embodiments of this application, an embodiment of this application further provides a communications system, including the foregoing network device and one or more terminal devices.

It should be understood that in the embodiments of this application, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory may include a read-only memory and a random access memory, and provide an instruction and data for the processor. A part of the memory may further include a nonvolatile random access memory.

In addition to a data bus, the bus system may further include a power bus, a control bus, a status signal bus, and the like. However, for clear description, various types of buses in the figure are marked as the bus system.

In an implementation process, the steps in the foregoing method can be implemented by using an integrated logical circuit of hardware in the processor, or by using instructions in a form of software. The steps of the method disclosed with reference to the embodiments of this application may be directly implemented by using a hardware processor, or may be performed by using a combination of hardware in the processor and a software module. The software module may be located in a mature storage medium in the art such as a random access memory, a flash memory, a read-only memory, a programmable read-only memory, an electrically erasable programmable memory, or a register. The storage medium is located in the memory, and the processor reads information from the memory and completes the steps in the foregoing method in combination with hardware of the processor. To avoid repetition, details are not described herein again.

It should be further understood that "first", "second", "third", "fourth", and various numerical numbers in this specification are merely used for distinguishing for ease of description, but are not used to limit the scope of the embodiments of the present disclosure.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the various embodiments of this application. The execution sequences of the processes should be determined according to functions and internal logic of the processes, and should not be construed as any limitation on the implementation processes of the embodiments of the present disclosure.

A person of ordinary skill in the art may be aware that, various illustrative logical blocks (illustrative logical block) and steps (step) that are described with reference to the embodiments disclosed in this specification can be implemented by using electronic hardware or a combination of computer software and electronic hardware. Whether the functions are performed by using hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of the embodiments.

In addition, the functional units in the embodiments of the present disclosure may be integrated into one processing unit, or each of the units may exist alone physically, or two or more units may be integrated into one unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of the present disclosure are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific implementations of the present disclosure, but the protection scope of the present disclosure is not limited thereto. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A communication method, comprising:
    receiving configuration information, wherein the configuration information is used to instruct a terminal device to report channel state information (CSI) for at least two groups of channel state information-reference signal (CSI-RS) resources, wherein each group of the at least two groups of CSI-RS resources comprises N subbands, and N is an integer greater than 1;
    receiving CSI-RSs carried on the at least two groups of CSI-RS resources; and
    reporting CSI based on a result of measuring the CSI-RSs carried on the at least two groups of CSI-RS resources,
    wherein the reported CSI comprises CSI corresponding to a first subband having a best performance in one or more subbands meeting a target requirement in the N subbands corresponding to the plurality of CSI-RS resources, wherein the one or more subbands meeting the target requirement are subbands whose block error rates are less than a preset block error rate threshold, and the first subband having the best performance in the one or more subbands meeting the target requirement is a particular subband of the one or more subbands meeting the target requirement having a highest throughput, a largest modulation and coding scheme (MCS), or a largest channel quality indicator (CQI) value in the one or more subbands meeting the target requirement.

2. The method according to claim 1, wherein the configuration information comprises one of the following:

a correspondence between the at least two groups of CSI-RS resources and a CSI reporting set;

an association relationship between identifiers of the at least two groups of CSI-RS resources or an association relationship between antenna ports of the at least two CSI-RS resources;

an association relationship between CSI reporting sets corresponding to the at least two groups of CSI-RS resources;

an association relationship between association information corresponding to the at least two groups of CSI-RS resources;

resource triggering information, wherein the resource triggering information is used to trigger a reporting set or a resource set of the at least two groups of CSI-RS resources;

indication information used to indicate that channel state information needs to be reported for at least one of a reporting set, a resource set, or association information of a CSI-RS resource; or a resource set of one group of the at least two groups of CSI-RS resources, wherein the resource set comprises identification information or antenna port information of the other group of the at least two groups of CSI-RS resources.

3. The method according to claim 1, wherein the reported CSI comprises one CQI.

4. The method according to claim 1, wherein the at least two groups of CSI-RS resources are M groups of CSI-RS resources; and
wherein the CSI corresponding to the first subband comprises T precoding matrix indicators (PMIs) corresponding to the first subband and P CQIs corresponding to the first subband, or the CSI comprises T PMIs corresponding to the first subband, a CQI corresponding to one group of CSI-RS resources in the first subband, and a CQI difference corresponding to the other group of CSI-RS resources, wherein the CQI difference is a difference between a CQI corresponding to the other group of CSI-RS resources and the CQI, and T is an integer not greater than M, P is an integer not less than 1 and not greater than M, and M is an integer not less than 2.

5. The method according to claim 1, wherein the at least two groups of CSI-RS resources are M groups of CSI-RS resources; and
a quantity of CQIs in the reported CSI is determined based on a quantity of reporting sets or resource sets of the M groups of CSI-RS resources, or a quantity of CQIs in the CSI is determined based on a quantity of reported CQIs that is configured in a reporting set of the M groups of CSI-RS resources; or
a quantity of PMIs in the reported CSI is determined based on a quantity of pieces of channel measurement association information corresponding to the M groups of CSI-RS resources, or a quantity of PMIs in the CSI is determined based on a quantity of pieces of QCL indication information corresponding to the M groups of resources.

6. The method according to claim 1, wherein:
the reported CSI comprises a CQI of a reference resource and a CQI difference or difference indication information corresponding to the other group of resources, the reference resource is one group of the at least two groups of CSI-RS resources, the CQI difference is a difference between a CQI of the other group of CSI-RS resources and the CQI of the reference resource, and the difference indication information is used to indicate the difference between the CQI of the other group of CSI-RS resources and the CQI of the reference resource.

7. The method according to claim 6, wherein:
the configuration information comprises indication information of the reference resource, the reference resource is determined by the terminal device based on the indication information of the reference resource, the indication information of the reference resource is used to indicate at least one of the following information corresponding to one group of the at least two groups of CSI-RS resources: resource identification information, association information identification information, and reporting set identification information; or the reference resource is determined by the terminal device in the at least two groups of CSI-RS resources according to a predefined rule.

8. An apparatus, comprising at least one processor and a memory coupled to the at least one processor, the at least one processor being configured to: receive configuration information, wherein the configuration information is used to instruct the terminal device to report channel state information (CSI) for at least two groups of channel state information-reference signal (CSI-RS) resources, each group of the at least two groups of CSI-RS resources comprises N subbands, and N is an integer greater than 1;

receive CSI-RSs carried on the at least two groups of CSI-RS resources; and report CSI based on a result of measuring the CSI-RSs carried on the at least two groups of CSI-RS resources, wherein the reported CSI comprises CSI corresponding to a first subband having a best performance in one or more subbands meeting a target requirement in the N subbands corresponding to the plurality of CSI-RS resources, wherein the one or more subbands meeting the target requirement are subbands whose block error rates are less than a preset block error rate threshold, and the first subband having the best performance in the one or more subbands meeting the target requirement is a particular subband of the one or more subbands meeting the target requirement having a highest throughput, a largest modulation and coding scheme (MCS), or a largest channel quality indicator (CQI) value in the one or more subbands meeting the target requirement.

9. The apparatus according to claim 8, wherein the configuration information comprises one of the following:

a correspondence between the at least two groups of CSI-RS resources and a CSI reporting set;

an association relationship between identifiers of the at least two groups of CSI-RS resources or an association relationship between antenna ports of the at least two CSI-RS resources;

an association relationship between CSI reporting sets corresponding to the at least two groups of CSI-RS resources;

an association relationship between association information corresponding to the at least two groups of CSI-RS resources;

resource triggering information, wherein the resource triggering information is used to trigger a reporting set or a resource set of the at least two groups of CSI-RS resources;

indication information used to indicate that channel state information needs to be reported for at least one of a reporting set, a resource set, or association information of a CSI-RS resource; or a resource set of one group of the at least two groups of CSI-RS resources, wherein the resource set comprises identification information or antenna port information of the other group of the at least two groups of CSI-RS resources.

10. The apparatus according to claim 8, wherein the reported CSI comprises one CQI.

11. The apparatus according to claim 8, wherein the at least two groups of CSI-RS resources are M groups of CSI-RS resources; and wherein the CSI corresponding to the first subband comprises T PMIs corresponding to the first subband and P CQIs corresponding to the first subband, or the CSI comprises T PMIs corresponding to the first subband, a CQI corresponding to one group of CSI-RS resources in the first subband, and a CQI difference corresponding to the other group of CSI-RS resources, wherein the CQI difference is a difference between a CQI corresponding to the other group of CSI-RS resources and the CQI, and T is an integer not greater than M, P is an integer not less than 1 and not greater than M, and M is an integer not less than 2.

12. The apparatus according to claim 8, wherein the at least two groups of CSI-RS resources are M groups of CSI-RS resources; and a quantity of CQIs in the reported CSI is determined based on a quantity of reporting sets or resource sets of the M groups of CSI-RS resources, or a quantity of CQIs in the CSI is determined based on a quantity of reported CQIs that is configured in a reporting set of the M groups of CSI-RS resources; or a quantity of PMIs in the reported CSI is determined based on a quantity of pieces of channel measurement association information corresponding to the M groups of CSI-RS resources, or a quantity of PMIs in the CSI is determined based on a quantity of pieces of QCL indication information corresponding to the M groups of resources.

13. The apparatus according to claim 8, wherein:

the reported CSI comprises a CQI of a reference resource and a CQI difference or difference indication information corresponding to the other group of resources, the reference resource is one group of the at least two groups of CSI-RS resources, the CQI difference is a difference between a CQI of the other group of CSI-RS resources and the CQI of the reference resource, and the difference indication information is used to indicate the difference between the CQI of the other group of CSI-RS resources and the CQI of the reference resource.

14. The apparatus according to claim 13, wherein:

the configuration information comprises indication information of the reference resource, the reference resource is determined by the terminal device based on the indication information of the reference resource, the indication information of the reference resource is used to indicate at least one of the following information corresponding to one group of the at least two groups of CSI-RS resources: resource identification information, association information identification information, and reporting set identification information; or the reference resource is determined by the terminal device in the at least two groups of CSI-RS resources according to a predefined rule.

* * * * *